(12) United States Patent
Camelio et al.

(10) Patent No.: US 11,214,632 B2
(45) Date of Patent: Jan. 4, 2022

(54) BIS-LIGATED PHOSPHAGUANIDINE GROUP IV METAL COMPLEXES AND OLEFIN POLYMERIZATION CATALYSTS PRODUCED THEREFROM

(71) Applicant: Dow Global Technologies LLC, Midland, MI (US)

(72) Inventors: Andrew M. Camelio, Midland, MI (US); Arkady L. Krasovskiy, Lake Jackson, TX (US); Matthew D. Christianson, Midland, MI (US); Amaruka Hazari, Carmel, IN (US); Heather Spinney, Midland, MI (US); Robert D J Froese, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 99 days.

(21) Appl. No.: 16/338,209

(22) PCT Filed: Sep. 29, 2017

(86) PCT No.: PCT/US2017/054270
§ 371 (c)(1),
(2) Date: Mar. 29, 2019

(87) PCT Pub. No.: WO2018/064461
PCT Pub. Date: Apr. 5, 2018

(65) Prior Publication Data
US 2020/0024377 A1 Jan. 23, 2020

Related U.S. Application Data

(60) Provisional application No. 62/402,541, filed on Sep. 30, 2016.

(51) Int. Cl.
*C08F 10/02* (2006.01)
*C07F 9/28* (2006.01)
*C08F 10/14* (2006.01)

(52) U.S. Cl.
CPC ........... *C08F 10/02* (2013.01); *C07F 9/28* (2013.01); *C08F 10/14* (2013.01)

(58) Field of Classification Search
CPC .................. C07F 9/28; C08F 4/64044
See application file for complete search history.

(56) References Cited

U.S. PATENT DOCUMENTS

| | | |
|---|---|---|
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,543,399 A | 9/1985 | Jenkins, III et al. |
| 4,613,484 A | 9/1986 | Ayres et al. |
| 4,882,400 A | 11/1989 | Dumain et al. |
| 5,064,802 A | 11/1991 | Stevens et al. |
| 5,153,157 A | 10/1992 | Hlatky et al. |
| 5,296,433 A | 3/1994 | Siedle et al. |
| 5,321,106 A | 6/1994 | Lapointe |
| 5,350,723 A | 9/1994 | Neithamer et al. |
| 5,352,749 A | 10/1994 | Dechellis et al. |
| 5,425,872 A | 6/1995 | Devore et al. |
| 5,541,270 A | 7/1996 | Chinh et al. |
| 5,625,087 A | 4/1997 | Neithamer et al. |
| 5,721,185 A | 2/1998 | Lapointe et al. |
| 5,783,512 A | 7/1998 | Jacobsen et al. |
| 5,883,204 A | 3/1999 | Spencer et al. |
| 5,919,983 A | 7/1999 | Rosen et al. |
| 6,103,657 A | 8/2000 | Murray |
| 6,515,155 B1 | 2/2003 | Klosin et al. |
| 6,696,379 B1 | 2/2004 | Carnahan et al. |
| 7,163,907 B1 | 1/2007 | Canich et al. |
| 2003/0225228 A1 | 12/2003 | Moody et al. |

FOREIGN PATENT DOCUMENTS

| | | |
|---|---|---|
| EP | 802202 B1 | 10/1999 |
| WO | 0008062 A1 | 2/2000 |
| WO | 2012027488 A1 | 3/2012 |

(Continued)

OTHER PUBLICATIONS

Coles, M. P. "Applications of neutral amidines and guanidines in coordination chemistry." Dalton Transactions 2006, 985.
Coles al., "Variable coordination chemistry of the phospha(III)guanidinate anion; application as a metal functionalized phosphine ligand." Chemical Communications 2002, 2794.
Crimmin et al., "Heavier Group 2 Element Catalyzed Hydrophosphination of Carbodiimides." Organometallics 2008, 2, 497.
Fahey, "Application of Metallocene Catalysts to Large-scale Slurry Loop Reactors", Metallocene-Based Polyolefins vol. 2 pp. 322-332 (2000).
Grundy et al., "Synthesis and coordination chemistry of neutralphospha(III)guanidines. Formation of 1-aza-3-phospha-4-metallacyclobut-1-ene rings at group 6 metals." Dalton Transactions 2003, 2573.

(Continued)

*Primary Examiner* — Catherine S Branch
(74) *Attorney, Agent, or Firm* — Dinsmore & Shohl

(57) ABSTRACT

Embodiments are directed to monophosphaguanidine ligands and the bis ligated metal-complexes formed therefrom, wherein the metal-ligand complexes are polymerization catalysts comprising the following structure (I).

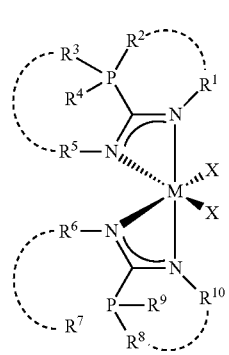

8 Claims, No Drawings

(56) References Cited

FOREIGN PATENT DOCUMENTS

| WO | 2018064493 A1 | 4/2018 |
| WO | 2018064339 A4 | 5/2018 |

OTHER PUBLICATIONS

Grundy, J.; Coles, M. P.; Avent, A. G.; and Hitchcock, P. B. "Self-organization in P-substituted guanidines leading to solution-state isomerization." Chemical Communications 2004, 2410.

Hey-Hawkins et al., "Insertion von Diphenylcarbodiimid in die Zr—P-Bindung von Cp'2Zr(Cl){P(SiMe3)2} (Cp' = C5H4Me); Molekulstrukturvon Cp'2Zr[N(Ph)C{P(SiMe3)2}N(Ph)](Cl)", Naturforsch, 2014, 951.

Issleib et al., "Phosphaguanidines. I. A new class of compounds with doubly coordinated trivalent, phosphorus." Journal of Organometallic Chemistry 1980, 192, 33.

Jin et al., "Synthesis and characterization of bulky guanidines and phosphaguanidines: precursors for low oxidation state metal-lacycles." New Journal of Chemistry 2009, 33, 64.

Lindenberg et al., "Formation of Novel P- and as-Functionalized Ligands by Insertion Reactions into the Zr—E Bond of (n5—C5H4R)2ZrCl{E(SiMe3)2} (R=Me, E=P, as; R=H, E=P)", Polyhedron, 1996, 1459.

Mansfield et al., "Lithium and aluminum complexes supported by chelating phosphaguanidinates." Dalton Transactions 2005, 2833.

Mansfield et al., "The effect of P-cyclohexyl groups on the coordination chemistry of phosphaguanidinates." Dalton Transactions 2006, 2052.

Mansfield et al., "Coordination chemistry of isomeric mixtures of linked di(phosphaguanidine) compounds: a spectroscopic and crystallographic study." Organometallics 2006, 2470.

Mansfield et al., "Phoshpa(III)guanidinate complexes of titanium(IV) and zirconium(IV) amides", Polyhedron 2010, 2481-2488.

Mansfield et al., "A conformational Study of Phospha(III)-and Phospha(V)-guanidine Compounds." Journal of the American Chemical Society 2006, 128, 13879.

Roering et al., "Insertion Reactions and Catalytic Hydrophosphination by Triamidoamine-Supported Zirconium Complexes", Organometallics, 2010, 2557.

Thewissen et al., "The chemistry of heteroallene and -allylic derivatives with rhodium and iridium. II. Rhodium(I) and iidium(I) phosphine complexes of heteroallylic ligands of the type [Ph2PC(X)NR]—(X = S, NR, O) and [Ph2P(Q)C(S)NR]—(Q = S, O). Synthesis and phosphorus-31 NMR." Journal of Organometallic Chemistry 1980, 192, 101.

Zhang et al., "Alkali-metal-catalyzed addition of primary and secondary phosphines to carbodiimides. A general and efficient route to substituted phosphaguanidines." Chemical Communications 2006, 3812.

International Search Report and Written Opinion pertaining to PCT/US2017/054270, dated Jan. 18, 2018.

ically known that polyolefin can be produced in solution phase polymerization process, gas phase polymerization process, and/or slurry phase polymerization process in one or more reactors, for example, connected in series or parallel, in the presence of one or more olefin polymerization catalyst systems.

BIS-LIGATED PHOSPHAGUANIDINE GROUP IV METAL COMPLEXES AND OLEFIN POLYMERIZATION CATALYSTS PRODUCED THEREFROM

CROSS REFERENCE TO RELATED APPLICATION

This application claims priority to U.S. Provisional Application 62/402,541, filed Sep. 30, 2016, which is incorporated herein by reference in its entirety.

TECHNICAL FIELD

Embodiments of the present disclosure generally relate to the synthesis of bis-ligated phosphguanidine metal catalyst systems used in olefin polymerization.

BACKGROUND

Olefin based polymers are utilized in the manufacture of a variety of articles and products, and thus, there is a high industrial demand for such polymers. Olefin based polymers, such as polyethylene and/or polypropylene, are produced via various catalyst systems. Selection of such catalyst systems used in the polymerization process is an important factor contributing to the characteristics and properties of such olefin based polymers.

The polyolefin polymerization process can be varied in a number of ways to produce a wide variety of resultant polyolefin resins having different physical properties suitable for use in different applications. It is generally known that polyolefin can be produced in solution phase polymerization process, gas phase polymerization process, and/or slurry phase polymerization process in one or more reactors, for example, connected in series or parallel, in the presence of one or more olefin polymerization catalyst systems.

Despite the research efforts in developing catalyst systems suitable for polyolefin polymerization, such as polyethylene, there is still a need for improved olefin polymerization catalysts to meet industrial demand for olefin based polymers.

SUMMARY

Accordingly, the present embodiments are directed to olefin polymerization catalyst systems, which provide alternative synthetic schemes for meeting industrial demand of olefin based polymers. Embodiments of the present disclosure are directed to new procatalysts, catalytic systems, and the produced polymers from the catalytic systems.

One or more embodiments of this disclosure include a metal-ligand complex according to the phosphaguanidine compound of formula I.

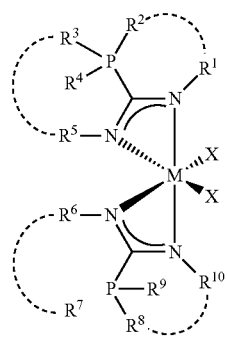

I

In formula I, $R^1$, $R^5$, $R^6$, and $R^{10}$ independently include the same or different moieties selected from hydride, aliphatic, heteroaliphatic, aromatic, and heteroaromatic moieties; each $R^2$, $R^3$, $R^7$, and $R^8$ independently include the same or different moieties selected from aliphatic moieties, aromatic moieties, or heteroaromatic moieties; each $R^4$ and $R^9$ independently include a lone pair of electrons or a heteroatom including, but not limited to, oxygen, sulfur, nitrogen, or boron; M is selected from titanium, zirconium, or hafnium; X is selected from aliphatic moieties, aromatic moieties, $NR^N_2$ moeities or halide moieties, wherein $R^N$ is selected from alkyl, aryl, or heteroaryl moieties; and each dotted line optionally defines a bridging connection.

Another embodiment of this disclosure includes the ethylene/α-olefin produced from the metal-ligand catalyst of formula I.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

The compounds, ligands, complexes, metal-ligand compounds or complexes are called "phosphaguanidine compounds." However, the term "phosphoryl guanidine" is considered interchangeable, and therefore using "phosphoryl guanidine" does not exclude compounds called "phosphaguanidine" and vice versa.

In some embodiments, the phosphaguanidine ligand may be obtained in a single step via hydrophosphination of a commercially available carbodiimide using a dialkyl or diarylphosphine or through a 4 step sequence beginning with the corresponding isothiocyanate. Condensation with an amine generates the thiourea which is then methylated with iodomethane to provide the methylisothioureas in high yields. Activation with stoichiometric silver nitrate in the presence of triethylamine generates the carbodiimides which are competent electrophiles for the insertion of disubstituted phosphines and phosphine-boranes using sub-stoichiometric quantities of n-butyl lithium or KHMDS. The first two reactions require no purification, and the only purification required for the last two reactions is a filtration through a Celite® or a polytetrafluoroethylene (PTFE) filter using hexanes and/or toluene or benzene to remove insoluble byproducts. Further illustration of various synthetic routes is provided below in the Examples section.

Phosphaguanidine Metal-Ligands

Formula I, as shown below, has at least two phosphaguanidine moieties and a transition metal center as part of its structural backbone. The general structure for the phosphaguanidine moiety can be found in other ligands and other phosphaguanidine metal complexes within this disclosure.

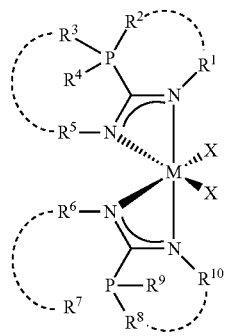

In formula I, each $R^1$, $R^5$, $R^6$, and $R^{10}$ independently includes the same or different moieties selected from hydride, aliphatic, heteroaliphatic, aromatic, and heteroaromatic moieties. Each $R^2$, $R^3$, $R^7$ and $R^8$ independently includes the same or different moieties selected from aliphatic moieties, heteroaliphatic moieties, aromatic moieties, or heteroaromatic moieties. Each $R^4$ and $R^9$ independently includes a lone pair of electrons, or a heteroatom including, but not limited to, nitrogen, oxygen, sulfur, or boron. M is selected from titanium, zirconium, or hafnium; Each X is independently selected from aliphatic moieties, aromatic moieties, halides, $NR^N_2$ moieties or halide moieties, wherein $R^N$ is selected from alkyl, aryl, or heteroaryl moieties; and each dotted line optionally defines a bridging connection.

One embodiment of the phosphaguanidine complex according to formula I includes X being selected from alkyl moieties including, but not limited to methyl, trimethylsilylmethylene, or benzyl, chloro, or $NMe_2$ moieties. $R^2$, $R^3$, $R^7$, and $R^8$ include the same or different moieties selected from phenyl rings, substituted phenyl rings, or alkyl groups; $R^4$ and $R^9$ include a lone pair of electrons; and $R^1$ $R^5$, $R^6$, and $R^{10}$ include the same or different moieties selected from hydride, alkyl including, but not limited to methyl, ethyl, iso-propyl, cyclohexyl tert-butyl, adamantyl, neopentyl, phenethyl, benzyl, or substituted and non-substituted phenyl moieties.

In one or more embodiments, each $R^1$, $R^5$, $R^6$, and $R^{10}$ independently chosen from a substituted or unsubstituted $(C_1-C_{40})$alkyl, or a substituted or unsubstituted $(C_6-C_{40})$ aryl. In some embodiments, each $R^1$, $R^5$, $R^6$, and $R^{10}$ independently chosen from a a substituted or unsubstituted $(C_1-C_{20})$alkyl such as methyl, ethyl, 1-propyl, 2-propyl, 2,2-dimethylpropyl, 1-butyl, 2-butyl, 2-methylpropyl, 1,1-dimethylethyl, 1-pentyl, 1-hexyl, 2-ethylhexyl, 1-heptyl, 1-nonyl, 1-decyl, 2,2,4-trimethylpentyl, or benzyl; a $(C_3-C_{10})$cycloalkyl such as cyclopropyl, cyclobutyl, cyclopentyl, cyclohexyl, cycloheptyl, cyclooctyl, cyclononyl, cyclodecyl; or a unsubstituted or unsubstituted $(C_6-C_{20})$aryl such as phenyl, 2,6-dimethylphenyl, 2,6-diisopropylphenyl, 2,4,6-triisopropylphenyl, 2,4,6-trimethylphenyl, 2-methyl-4,6-diisopropylphenyl, 4-methoxyphenyl, and 4-methoxy-2,6-dimethylphenyl, 4-methylphenyl, napthyl, and substituted napthyl.

In one or more embodiments, each $R^2$, $R^3$, $R^7$, and $R^8$ are independently chosen from phenyl or cyclohexyl; and $R^4$ and $R^9$ are lone pair of electrons or an oxygen.

In some embodiments, $R^2$, $R^3$, $R^7$, and $R^8$ may be phenyl; and $R^1$, $R^5$, $R^6$, and $R^{10}$ are independently chosen from 2-methylphenyl, 4-methylphenyl, cyclohexyl, ethyl, 2-propyl, 2,2-dimethylpropyl, benzyl, napthyl, or 2,6-dimethylphenyl.

In other embodiments, $R^2$, $R^3$, $R^7$, and $R^8$ may be cyclohexyl; and $R^1$, $R^5$, $R^6$, and $R^{10}$ are 2-propyl.

In some embodiments, $R^1$ and $R^{10}$ are benzyl; and $R^5$ and $R^6$ are cyclohexyl. In other embodiments, $R^1$ and $R^{10}$ are benzyl; and $R^5$ and $R^6$ are isopropyl. In one or more embodiments, $R^1$ and $R^{10}$ are benzyl; and $R^5$ and $R^6$ are napthyl. In other embodiments, $R^1$ and $R^{10}$ are benzyl; and $R^5$ and $R^6$ are 2,6-dimethylphenyl.

The term "independently selected" is used herein to indicate that the R groups, such as, $R^1$, $R^2$, $R^3$, $R^4$, and $R^5$ can be identical or different (e.g. $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The terms "moiety," "functional group," "group," or "substituent" may be used interchangeably in this specification, but those of skill in the art may recognize certain parts of a complex or compound as being a moiety rather than a functional group and vice versa. Additionally, the term "moiety" includes functional groups and/or discrete bonded residues that are present in the phosphaguanidine compounds or metal-ligand complexes of this disclosure. The term "moiety" as used in the present application is inclusive of individual units as described in formula I.

The term "complex" means a metal and ligand coordinated together to form a single molecular compound. The coordination may be formed through dative or covalent bonds. For the purposes of illustration, certain representative groups are defined within this disclosure. These definitions are intended to supplement and illustrate, not preclude, the definitions known to those of skill in the art.

The term "aliphatic" encompasses the terms "alkyl," "branching alkyl," "$(C_1-C_{40})$hydrocarbyl," "substituted $(C_1-C_{40})$hydrocarbyl," "$(C_3-C_{40})$hydrocarbylene," and "substituted $(C_3-C_{40})$hydrocarbylene."

The term "heteroaliphatic" includes "$(C_1-C_{40})$heterohydrocarbyls," and "substituted $(C_1-C_{40})$heterohydrocarbyls," "$[(C+Si)_3-(C+Si)_{40}]$ organosilylene," "substituted $[(C+Si)_3-(C+Si)_{40}]$ organosilylene," "$[(C+Ge)_3-(C+Ge)_{40}]$ organogermylene," and substituted $[(C+Ge)_3-(C+Ge)_{40}]$ organogermylene."

The term "aromatic" or "aryl" encompasses the terms: "$(C_6-C_{40})$aryl" and "substituted $(C_6-C_{40})$aryl group." The term "heteroaromatic" includes "$(C_1-C_{40})$heteroaryl," and "$(C_2-C_{40})$heteroaryl."

In an alternative embodiment, each of the $(C_1-C_{40})$hydrocarbyl and $(C_1-C_{40})$heterohydrocarbyl of any one or more of $R^1$, $R^2$, $R^4$, $R^5$, $R^6$, $R^7$, $R^8$, $R^9$, and $R^{10}$ independently is unsubstituted or substituted with one or more $R^S$ substituents, and wherein each $R^S$ independently is a halogen atom, polyfluoro substitution, perfluoro substitution, unsubstituted $(C_1-C_{18})$alkyl, $(C_6-C_{18})$aryl, $(C_3-C_{18})$heteroaryl, $F_3C$, $FCH_2O$, $F_2HCO$, $F_3CO$, $(R^C)_3Si$, $(R^C)_3Ge$, $(R^C)O$, $(R^C)S$, $(R^C)S(O)$, $(R^C)S(O)_2$, $(R^C)_2P$, $(R^C)_2N$, $(R^C)_2C=N$, NC, $NO_2$, $(R^C)C(O)O$, $(R^C)OC(O)$, $(R^C)C(O)N(R^C)$, or $(R^C)_2NC(O)$, or two of the $R^S$ are taken together to form an unsubstituted $(C_1-C_{18})$alkylene, wherein each $R^S$ independently is an unsubstituted $(C_1-C_{18})$alkyl.

When used to describe certain carbon atom-containing chemical groups (e.g., $(C_1-C_{40})$alkyl), the parenthetical expression $(C_1-C_{40})$ can be represented by the form "$(C_x-C_y)$," which means that the unsubstituted version of the chemical group comprises from a number x carbon atoms to a number y carbon atoms, wherein each x and y independently is an integer as described for the chemical group. The $R^S$ substituted version of the chemical group can contain more than y carbon atoms depending on nature of $R^S$. Thus, for example, an unsubstituted $(C_1-C_{40})$alkyl contains from 1 to 40 carbon atoms (x=1 and y=40). When the chemical group is substituted by one or more carbon atom-containing $R^S$ substituents, the substituted $(C_x-C_y)$ chemical group may comprise more than y total carbon atoms; i.e., the total number of carbon atoms of the carbon atom-containing substituent(s)-substituted $(C_x-C_y)$ chemical group is equal to y plus the sum of the number of carbon atoms of each of the carbon atom-containing substituent(s). Any atom of a chemical group that is not specified herein is understood to be a hydrogen atom.

In some embodiments, each of the chemical groups (e.g. $R^1$, $R^2$, $R^3$, $R^4$, $R^5$, and $R^6$) of the metal complex of formula I may be unsubstituted, that is, can be defined without use of a substituent $R^S$, provided that the above-mentioned conditions are satisfied. In other embodiments, at least one of the chemical groups of the metal-ligand complex of formula I independently contain one or more of the substituents $R^S$. When the metal-ligand complex contains two or more substituents $R^S$, each $R^S$ independently is bonded to a same or different substituted chemical group. When two or more $R^S$ are bonded to a same chemical group, they independently are bonded to a same or different carbon atom or heteroatom, as the case may be, in the same chemical group up to and including persubstitution of the chemical group.

The term "persubstitution" means each hydrogen atom (H) bonded to a carbon atom or heteroatom of a corresponding unsubstituted compound or functional group, as the case may be, is replaced by a substituent (e.g., $R^S$). The term "polysubstitution" means each of at least two, but not all, hydrogen atoms (H) bonded to carbon atoms or heteroatoms of a corresponding unsubstituted compound or functional group, as the case may be, is replaced by a substituent (e.g., $R^S$). The term "monosubstitution" means that only one hydrogen atom (H) bonded to a carbon atom or heteroatom of a corresponding unsubstituted compound or functional group, as the case may be, is replaced by a substituent (e.g., $R^S$). The $(C_1-C_{18})$alkylene and $(C_1-C_8)$alkylene substituents are especially useful for forming substituted chemical groups that are bicyclic or tricyclic analogs, as the case may be, of corresponding monocyclic or bicyclic unsubstituted chemical groups.

As used herein, the definitions of the terms hydrocarbyl, heterohydrocarbyl, hydrocarbylene, heterohydrocarbylene, alkyl, alkylene, heteroalkyl, heteroalkylene, aryl, arylene, heteroaryl, heteroarylene, cycloalkyl, cycloalkylene, heterocycloalkyl, heterocycloalkylene, organosilylene, organogermylene are intended to include every possible stereoisomer.

Heteroalkyl and heteroalkylene groups are saturated straight or branched chain radicals or diradicals, respectively, containing $(C_1-C_{40})$carbon atoms, and one or more of the heteroatoms or heteroatomic groups O; S; N; S(O); $S(O)_2$; $S(O)_2N$; $Si(R^C)_2$; $Ge(R^C)_2$; $P(R^C)$; $P(O)(R^C)$; and $N(R^C)$, as defined above, wherein each of the heteroalkyl and heteroalkylene groups independently are unsubstituted or substituted by one or more $R^S$. Examples of substituted and unsubstituted heteroalkyl groups are methoxyl; ethoxyl; trimethylsilyl; dimethylphenylsilyl; tert-butyldimethylsilyl; and dimethylamino.

As used herein, the term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and polycyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

In some embodiments, $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In further embodiments, each of the aforementioned $(C_1-C_{40})$hydrocarbyl groups independently has a maximum of 20 carbon atoms (i.e., $(C_1-C_{20})$hydrocarbyl), and in other embodiments, a maximum of 15 carbon atoms.

The term "$(C_1-C_{40})$alkyl" means a saturated straight or branched hydrocarbon radical of from 1 to 40 carbon atoms that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 2,2-dimethylpropyl; 1-butyl; 2-butyl; 2-methylpropyl; 1,1-dimethylethyl; 1-pentyl; 1-hexyl; 2-ethylhexyl, 1-heptyl; 1-nonyl; 1-decyl; 2,2,4-trimethylpentyl; Examples of substituted $(C_1-C_{40})$alkyl are substituted $(C_1-C_{20})$alkyl; substituted $(C_1-C_{10})$alkyl; trifluoromethyl; trimethylsilylmethyl; methoxymethyl; dimethylaminomethyl; trimethylgermylmethyl; phenylmethyl (benzyl); 2-phenyl-2,2-methylethyl; 2-(dimethylphenylsilyl)ethyl; and dimethyl(t-butyl) silylmethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein one ring is aromatic and the optional second and third rings independently are fused or non-fused and the second and third rings are each independently optionally aromatic. Examples of unsubstituted $(C_6-C_{40})$aryl are unsubstituted $(C_6-C_{20})$aryl; unsubstituted $(C_6-C_{18})$aryl; phenyl; biphenyl; ortho-terphenyl; meta-terphenyl; fluorenyl; tetrahydrofluorenyl; indacenyl; hexahydroindacenyl; indenyl; dihydroindenyl; naphthyl; tetrahydronaphthyl; phenanthrenyl and triptycenyl. Examples of substituted $(C_6-C_{40})$aryl are substituted $(C_6-C_{20})$aryl; substituted $(C_6-C_{18})$aryl; 2,6-bis[$(C_1-C_{20})$alkyl]-phenyl; 2-$(C_1-C_5)$alkyl-phenyl; 2,6-bis$(C_1-C_5)$alkyl-phenyl; 2,4,6-tris$(C_1-C_5)$alkyl-phenyl; polyfluorophenyl; pentafluorophenyl; 2,6-dimethylphenyl; 2,6-diisopropylphenyl; 2,4,6-triisopropylphenyl; 2,4,6-trimethylphenyl; 2-methyl-6-trimethylsilylphenyl; 2-methyl-4,6-diisopropylphenyl; 4-methoxyphenyl; and 4-methoxy-2,6-dimethylphenyl.

The term "$(C_3-C_{40})$cycloalkyl" means a saturated cyclic or polycyclic (i.e. fused or unfused) hydrocarbon radical of from 3 to 40 carbon atoms that is unsubstituted or substituted by one or more $R^S$. Other cycloalkyl groups (e.g., $(C_3-C_{12})$alkyl)) are defined in an analogous manner. Examples of unsubstituted $(C_3-C_{40})$cycloalkyl are unsubstituted $(C_3-C_{20})$cycloalkyl, unsubstituted $(C_3-C_{10})$cycloalkyl; cyclopropyl; cyclobutyl; cyclopentyl; cyclohexyl; cycloheptyl; cyclooctyl; cyclononyl; cyclodecyl; octahydroindenyl; bicyclo [4.4.0]decyl; bicyclo[2.2.1]heptyl; and tricyclo[3.3.1.1] decyl. Examples of substituted $(C_3-C_{40})$cycloalkyl are substituted (C$_3$-C$_{20}$)cycloalkyl; substituted (C$_3$-C$_{10}$)cycloalkyl; 2-methylcyclohexyl; and perfluorocyclohexyl.

Examples of (C$_1$-C$_{40}$)hydrocarbylene are unsubstituted or substituted (C$_3$-C$_{40}$)hydrocarbylene; (C$_6$-C$_{40}$)arylene, (C$_3$-C$_{40}$)cycloalkylene, and (C$_3$-C$_{40}$)alkylene (e.g., (C$_3$-C$_{20}$)alkylene).

The term "(C$_1$-C$_{40}$)alkylene" means a saturated or unsaturated straight chain or branched chain diradical of from 1 to 40 carbon atoms that is unsubstituted or substituted by one or more R$^S$. Examples of unsubstituted (C$_1$-C$_{40}$)alkylene are unsubstituted (C$_3$-C$_{20}$)alkylene, including unsubstituted 1,3-(C$_3$-C$_{10}$)alkylene; 1,4-(C$_4$-C$_{10}$)alkylene; —(CH$_2$)$_3$—; —(CH$_2$)$_4$—; —(CH$_2$)$_5$—; —(CH$_2$)$_6$—; —(CH$_2$)$_7$—; —(CH$_2$)$_8$—; and —(CH$_2$)$_4$CH(CH$_3$)—. Examples of substituted (C$_1$-C$_{40}$)alkylene are substituted (C$_3$-C$_{20}$)alkylene; —CF$_2$CF$_2$CF$_2$—; and —(CH$_2$)$_{14}$C(CH$_3$)$_2$(CH$_2$)$_5$— (i.e., a 6,6-dimethyl substituted normal-1,20-eicosylene). Since as mentioned previously two R$^S$ may be taken together to form a (C$_1$-C$_{40}$)alkylene, examples of substituted (C$_1$-C$_{40}$)alkylene also include 1,2-bis(methylene)cyclopentane; 1,2-bis(methylene)cyclohexane; 2,3-bis(methylene)-7,7-dimethylbicyclo[2.2.1]heptane; and 2,3-bis(methylene)bicyclo[2.2.2]octane.

The term "(C$_3$-C$_{40}$)cycloalkylene" means a cyclic diradical (i.e., the radicals are on ring atoms) of from 3 to 40 carbon atoms that is unsubstituted or substituted by one or more R$^S$. Examples of unsubstituted (C$_3$-C$_{40}$)cycloalkylene are 1,3-cyclobutylene, 1,3-cyclopentylene, and 1,4-cyclohexylene. Examples of substituted (C$_3$-C$_{40}$)cycloalkylene are 2-trimethylsilyl-1,4-cyclohexylene and 1,2-dimethyl-1,3-cyclohexylene.

The terms "(C$_1$-C$_{40}$)heterohydrocarbyl" and "(C$_1$-C$_{40}$)heterohydrocarbylene" mean a heterohydrocarbon radical or diradical, respectively, of from 1 to 40 carbon atoms, and each heterohydrocarbon independently has one or more heteroatoms or heteroatomic groups O; S; N; S(O); S(O)$_2$; S(O)$_2$N; Si(R$^C$)$_2$; Ge(R$^C$)$_2$; P(R$^C$); P(O)(R$^C$); and N(R$^C$), wherein independently each R$^C$ is hydrogen, unsubstituted (C$_1$-C$_{15}$)hydrocarbyl or an unsubstituted (C$_1$-C$_{18}$)heterohydrocarbyl, or absent (e.g., absent when N comprises —N═). Each (C$_1$-C$_{40}$)heterohydrocarbyl and (C$_1$-C$_{40}$)heterohydrocarbylene independently is unsubstituted or substituted (by one or more R$^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

The (C$_1$-C$_{40}$)heterohydrocarbyl independently is unsubstituted or substituted (C$_1$-C$_{40}$)heteroalkyl, (C$_1$-C$_{40}$)hydrocarbyl-O—, (C$_1$-C$_{40}$)hydrocarbyl-S—, (C$_1$-C$_{40}$)hydrocarbyl-S(O)—, (C$_1$-C$_{40}$)hydrocarbyl-S(O)$_2$—, (C$_1$-C$_{40}$)hydrocarbyl-Si(R$^C$)$_2$—, (C$_1$-C$_{40}$)hydrocarbyl-Ge(R$^C$)$_2$—, (C$_1$-C$_{40}$)hydrocarbyl-N(R$^C$)—, (C$_1$-C$_{40}$)hydrocarbyl-P(R$^C$)—, (C$_2$-C$_{40}$)heterocycloalkyl, (C$_2$-C$_{19}$)heterocycloalkyl-(C$_1$-C$_{20}$)alkylene, (C$_3$-C$_{20}$)cycloalkyl-(C$_1$-C$_{19}$)heteroalkylene, (C$_2$-C$_{19}$)heterocycloalkyl-(C$_1$-C$_{20}$)heteroalkylene, (C$_1$-C$_{40}$)heteroaryl, (C$_1$-C$_{19}$)heteroaryl-(C$_1$-C$_{20}$)alkylene, (C$_6$-C$_{20}$)aryl-(C$_1$-C$_{19}$)heteroalkylene, or (C$_1$-C$_{19}$)heteroaryl-(C$_1$-C$_{20}$)heteroalkylene. The term "(C$_1$-C$_{40}$)heteroaryl" means an unsubstituted or substituted (by one or more R$^S$) mono-, bi- or tricyclic heteroaromatic hydrocarbon radical of from 1 to 40 total carbon atoms and from 1 to 6 heteroatoms, and the mono-, bi- or tricyclic radical comprises 1, 2 or 3 rings, respectively, wherein one ring is heteroaromatic and the optional second and third rings independently are fused or non-fused; and the second or third rings are each independently optionally heteroaromatic. Other heteroaryl groups (e.g., (C$_1$-C$_{12}$)heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 3 to 5 carbon atoms and 1 to 3 heteroatoms, the heteroatoms being N or P. Examples of 6-membered ring heteroaromatic hydrocarbon radical are pyridine-2-yl; pyrimidin-2-yl; and pyrazin-2-yl. The bicyclic heteroaromatic hydrocarbon radical is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical is a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

In some embodiments the (C$_2$-C$_{40}$)heteroaryl is 2,7-disubstituted carbazolyl or 3,6-disubstituted carbazolyl, wherein each R$^S$ independently is phenyl, methyl, ethyl, isopropyl, or tertiary-butyl, 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

Examples of unsubstituted (C$_2$-C$_{40}$)heterocycloalkyl are unsubstituted (C$_2$-C$_{20}$)heterocycloalkyl, unsubstituted (C$_2$-C$_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-azacyclodecyl.

The term "halogen atom" means fluorine atom (F), chlorine atom (Cl), bromine atom (Br), or iodine atom (I) radical. Each halogen atom independently is the Br radical, F radical, or Cl radical. The term "halide" means fluoride (F$^-$), chloride (Cl$^-$), bromide (Br$^-$), or iodide (I$^-$) anion.

There are no O—O, S—S, or O—S bonds, other than O—S bonds in an S(O) or S(O)$_2$ diradical functional group, in the aforementioned embodiments of the metal-ligand complexes of formula I. Additionally, there are no 0-0, P—P, S—S, or O—S bonds, other than O—S bonds in an S(O) or S(O)$_2$ diradical functional group, in the metal-ligand complexes of formula I.

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents R$^S$, one or more double and/or triple bonds optionally may or may not be present in substituents R$^S$. The term "unsaturated" means containing one or more carbon-carbon double bonds, carbon-carbon triple bonds, and (in heteroatom-containing groups) carbon-nitrogen, carbon-phosphorous, carbon-silicon double bonds, and carbon-nitrogen triple bonds, not including any such double bonds that may be present in substituents $R^S$, if any, or in (hetero)aromatic rings, if any.

M is titanium, zirconium, or hafnium. In one embodiment, M is titanium. In another embodiment, M is zirconium. In another embodiment, M is hafnium. In some embodiments, M is in a formal oxidation state of +2, +3, or +4. Each X independently is a monodentate or polydentate ligand that is neutral, monoanionic, or dianionic. X and n are chosen in such a way that the metal-ligand complexes of formula I are, overall, neutral. In some embodiments, each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, borate, borohydride, sulfate, $HC(O)O^-$, alkoxide or aryloxide $(RO^-)$, $(C_1-C_{40})$hydrocarbylC(O)O$^-$, $HC(O)N(H)^-$, $(C_1-C_{40})$hydrocarbylC(O)N(H)$^-$, $(C_1-C_{40})$hydrocarbylC(O)N((C_1-C_{20})$hydrocarbyl)$^-$, $R^K R^L B^-$, $R^K R^L N^-$, $R^K O^-$, $R^K S^-$, $R^K R^L P^-$, or $R^M R^K R^L Si^-$, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene and $R^M$ is as defined previously.

In some embodiments at least one monodentate ligand of X independently is the neutral ligand. In one embodiment, the neutral ligand is a neutral Lewis base group that is $R^X NR^K R^L$, $R^K OR^L$, $R^K SR^L$, or $R^X PR^K R^L$, wherein each $R^X$ independently is hydrogen, $(C_1-C_{40})$hydrocarbyl, $[(C_1-C_{10})$hydrocarbyl]$_3$Si, $[(C_1-C_{10})$hydrocarbyl]$_3$Si$(C_1-C_{10})$hydrocarbyl, or $(C_1-C_{40})$heterohydrocarbyl and each $R^K$ and $R^L$ independently is as defined previously.

In some embodiments, each X is a monodentate ligand that independently is a halogen atom, unsubstituted $(C_1-C_{20})$hydrocarbyl, unsubstituted $(C_1-C_{20})$hydrocarbylC(O)O—, or $R^K R^L N$— wherein each of $R^K$ and $R^L$ independently is an unsubstituted $(C_1-C_{20})$hydrocarbyl. In some embodiments each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^K R^L N$— wherein each of $R^K$ and $R^L$ independently is an unsubstituted $(C_1-C_{10})$hydrocarbyl.

In some embodiments, there are at least two X groups, and the two X groups are taken together to form the bidentate ligand. In some embodiments the bidentate ligand is a neutral bidentate ligand. In one embodiment, the neutral bidentate ligand is a diene of formula $(R^D)_2 C = C(R^D)$—C(R $C(R^D)_2$, wherein each $R^D$ independently is H, unsubstituted $(C_1-C_6)$alkyl, phenyl, or naphthyl. In some embodiments the bidentate ligand is a monoanionic-mono(Lewis base) ligand. The monoanionic-mono(Lewis base) ligand may be a 1,3-dionate of formula (D): $R^E$—C(O$^-$)=CH—C(=O)—$R^E$ (D), wherein each $R^D$ independently is H, unsubstituted $(C_1-C_6)$alkyl, phenyl, or naphthyl. In some embodiments the bidentate ligand is a dianionic ligand. The dianionic ligand has a net formal oxidation state of −2. In one embodiment, each dianionic ligand independently is carbonate, oxalate (i.e., $^-O_2CC(O)O^-$), $(C_2-C_{40})$hydrocarbylene dicarbanion, $(C_1-C_{40})$ heterohydrocarbylene dicarbanion, phosphate, or sulfate.

As previously mentioned, number and charge (neutral, monoanionic, dianionic) of X are selected depending on the formal oxidation state of M such that the metal-ligand complexes of formula I are, overall, neutral. In some embodiments each X is the same, wherein each X is methyl, isobutyl, neopentyl, neophyl, trimethylsilylmethyl, phenyl, benzyl, or chloro. In other embodiments, at least two X groups are different; and in further embodiments, each X comprises a different groups selected from methyl, isobutyl, neopentyl, neophyl, trimethylsilylmethyl, phenyl, benzyl, and chloro.

The "bridging connection," which is optional in formula I, connects one R group to a different R group. For example, in formula I, $R^2$ can optionally be connected to $R^1$ via a bridging connection that is separate from the formula I, as depicted. The bridging connection can be an aliphatic moiety, a heteroaliphatic moiety, an aryl moiety or a heteroaryl moiety. The optional bridging connections are at least three atoms. In formula I, the R groups that could form a bridging connection are bonded to heteroatoms, therefore the atoms in the "bridging connection" are the fewest number of atoms from one heteroatom to the other heteroatom.

In one embodiment, the metal-ligand complex of formula I are a mononuclear metal complex. In another embodiment, the metal-ligand of formula I comprises a bidentate phosphaguanidine ligand. In a further embodiment, the olefin polymerization catalyst system comprises a double bidentate phosphaguanidine ligated procatalyst component facilitating the production of high molecular weight $(M_w)$ polyolefins with narrow polydispersity and low octene incorporation. In another embodiment, olefin polymerization catalyst systems of the metal-ligand complexes and catalysts in this disclosure demonstrate reversible chain transfer indicative of chain shuttling behavior in the presence of appropriate chain shuttling agents. Such combination of attributes is particularly of interest in the preparation of olefin block copolymers. In general, the ability to tune alpha-olefin incorporation and thus short-chain branching distribution is critical to accessing materials with performance differentiation.

Some of the aforementioned embodiments of the metal-ligand complexes that results from formula I are shown below. The structures with the name, MCI-#, are a specific embodiment of formula I, and the structures with the name, L #, are the ligand precursors, however the number does not necessarily match the metal-ligand complex to the ligand. While the complexes can be categorized as "polymerization catalysts," which includes a phosphaguanidine moiety, it should be noted that these polymerization catalysts are "phosphaguanidine metal complexes" or "metal-ligand complexes" and are referred to as such.

Specific Embodiments of Metal-ligand Complexes of Formula I

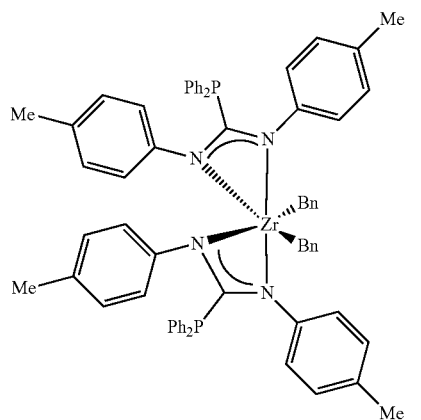

MCI-1

MCI-2
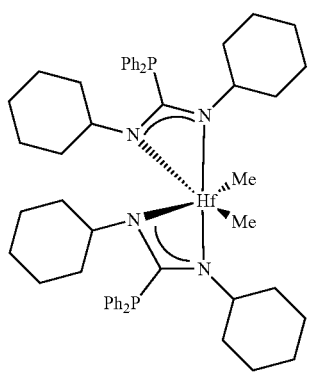
MCI-3
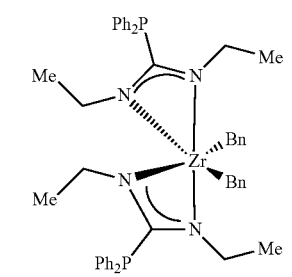
MCI-4
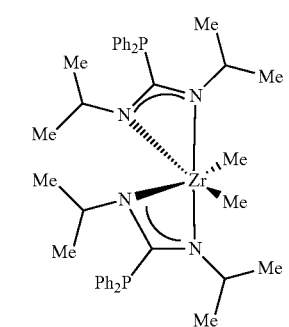
MCI-5
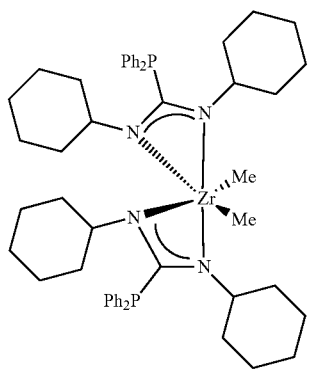
MCI-6
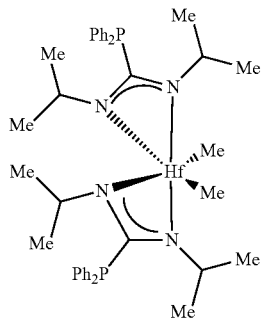
MCI-7
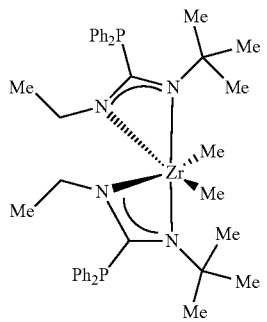
MCI-8
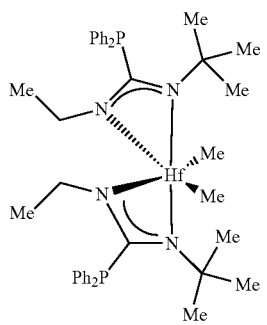
MCI-9
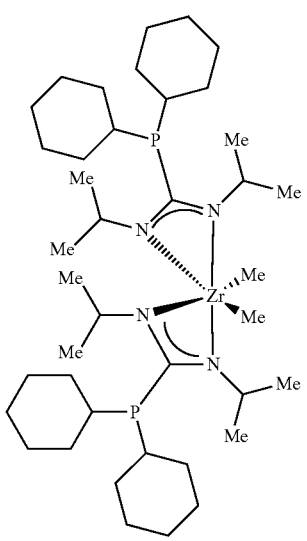

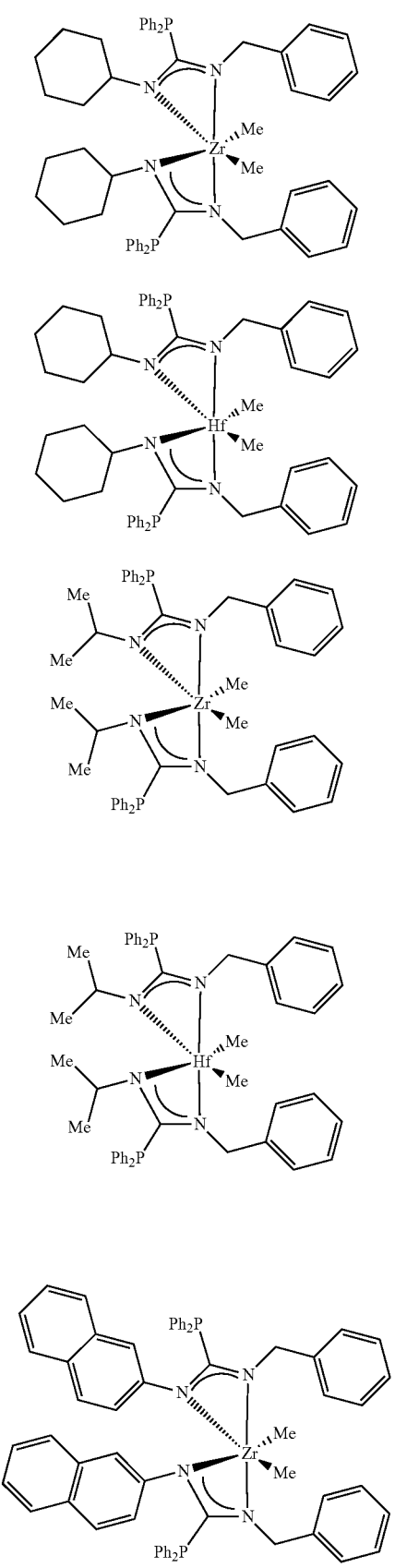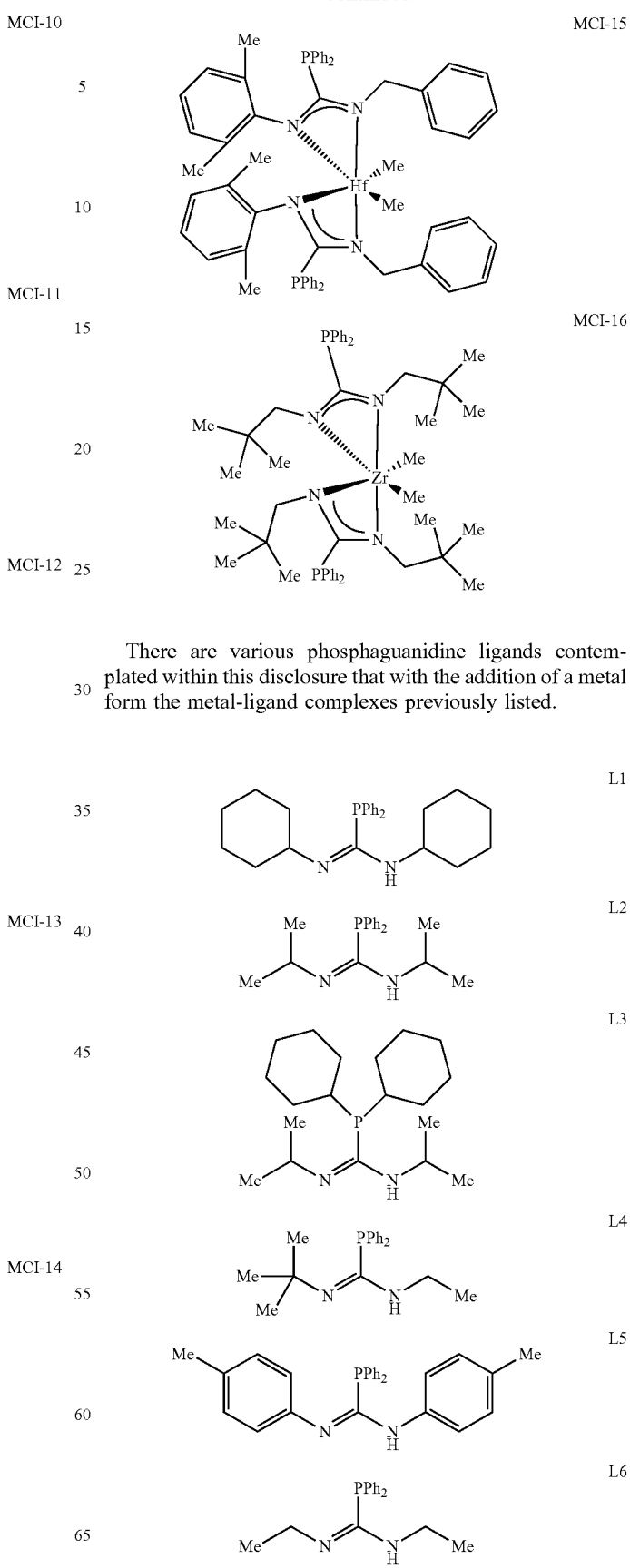
There are various phosphaguanidine ligands contemplated within this disclosure that with the addition of a metal form the metal-ligand complexes previously listed.

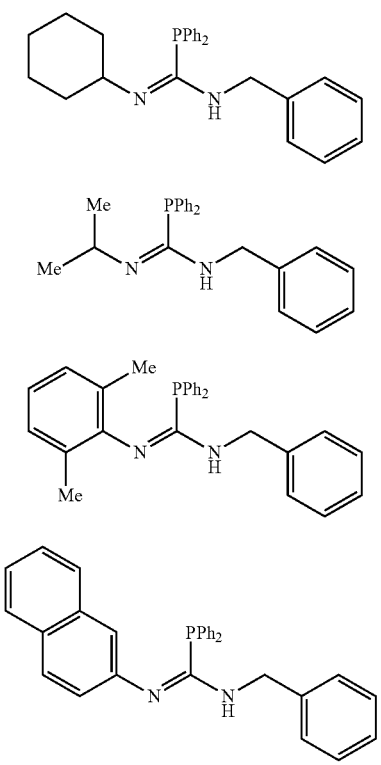

The metal-ligand complexes can be formed from any of ligands L1 to L10. The metal-ligand complexes formed from the ligands may be catalysts or procatalysts. The terms "metal-ligand complex(es)," "catalyst(s)," "procatalysts" or "polymerization catalyst" may be used interchangeably. The metal-ligand complexes disclosed herein can have multiple reaction sites, while some have single site reaction.

Cocatalysts

The procatalyst comprising the aforementioned embodiments of the metal-ligand complexes of formula I is rendered catalytically active by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri(($C_1$-$C_{10}$) alkyl)aluminum or tri(($C_6$-$C_{18}$)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris(($C_1$-$C_{20}$) hydrocarbyl) borate (e.g., trityl tetrafluoroborate) or a tri (($C_1$-$C_{20}$)hydrocarbyl)ammonium tetra(($C_1$-$C_{20}$)hydrocarbyl)borane (e.g., bis(octadecyl)methylammonium tetrakis (pentafluorophenyl)borane or cocatalyst-1). As used herein, the term "ammonium" means a nitrogen cation that is a (($C_1$-$C_{20}$)hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbyl N(H)$_3^+$, or N(H)$_4^+$, wherein each ($C_1$-$C_{20}$)hydrocarbyl may be the same or different.

Exemplary combinations of neutral Lewis acid activating co-catalysts include mixtures comprising a combination of a tri(($C_1$-$C_4$)alkyl)aluminum and a halogenated tri(($C_6$-$C_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane or cocatalyst-2 with a polymeric or oligomeric alumoxane. Exemplary embodiments ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complexes of formula I may be activated to form an active catalyst composition by combination with one or more cocatalyst. A non-limiting list of possible cocatalysts include: strong Lewis acids; compatible, noncoordinating, ion forming compounds, such as bis(hydrogenated tallow alkyl)methyl ammonium and tetrakis(pentafluorophenyl)borate(1-) amine; a cation forming cocatalyst; polymeric or oligomeric aluminoxanes, especially methyl aluminoxane and modified methyl aluminoxane (MMAO); organoaluminum compounds, such as triethyl aluminum (TEA); and any combinations thereof.

In one embodiment, one or more of the foregoing activating co-catalysts are used in combination with each other. In another embodiment, the combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound.

The ratio of total number of moles of one or more metal-ligand complexes of general metal complex 1 to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, the number of moles of the alumoxane that are employed should be at least 100 times the number of moles of the metal-ligand complex general metal complex 1. When tris(pentafluorophenyl)borane alone is used as the activating co-catalyst, in some other embodiments, the number of moles of the tris(pentafluorophenyl)borane that are employed to the total number of moles of one or more metal-ligand complexes of general metal complex 1 form 0.5:1 to 10:1, in some other embodiments, from 1:1 to 6:1, in some other embodiments, from 1:1 to 5:1. The remaining activating co-catalysts are generally employed in approximately mole quantities equal to the total mole quantities of one or more metal-ligand complexes of formula I.

In one embodiment, the procatalyst comprising the metal-ligand complexes described above may be combined with chain-transfer agent in a chain-transfer polymerization process to prepare an olefin block copolymer. Suitable catalysts for use include any compound or combination of compounds that is adapted for preparing polymers of the disclosed composition or type and are capable of chain shuttling. Nonlimiting examples of such catalysts include dialkylzinc reagents and trialkylaluminum reagents. In one embodiment, the chain transfer agent comprises diethyl zinc.

Polyolefin Compositions

The polyolefin composition produced from the present catalysts comprises the reaction product of one or more olefinic monomers with the olefin polymerization catalyst system according to the present disclosure under polymerization conditions and in the presence of one or more co-catalysts and/or scavengers.

The polyolefin composition according to the present disclosure can, for example, be an ethylene-based polymer, for example homopolymers and/or interpolymers (including copolymers) of ethylene and optionally one or more comonomers such as α-olefins. Such ethylene-based polymers can have a density in the range of 0.860 to 0.973 g/cm³. All individual values and subranges from 0.860 to 0.973 g/cm³ are included herein and disclosed herein; for example, the density can be from a lower limit of 0.860, 0.880, 0.885, 0.900, 0.905, 0.910, 0.915, or 0.920 g/cm³ to an upper limit of 0.973, 0.963, 0.960, 0.955, 0.950, 0.925, 0.920, 0.915, 0.910, or 0.905 g/cm³.

As used herein, the term "ethylene-based polymer" means a polymer having greater than 50 mol % units derived from ethylene monomer.

In one embodiment, the ethylene-based polymers can have a long chain branching frequency in the range of from 0.0 to 3 long chain branches (LCB) per 1000 carbon atoms. In one embodiment, the ethylene-based polymers can have a molecular weight distribution ($M_w/M_n$) (measured according to the conventional GPC method) in the range of from greater than or equal to 2.0. All individual values and subranges from greater than or equal to 2 are included herein and disclosed herein; for example, the ethylene/α-olefin copolymer may have a molecular weight distribution ($M_w/M_n$) in the range of from 2 to 20; or in the alternative, the ethylene/α-olefin interpolymer may have a molecular weight distribution ($M_w/M_n$) in the range of from 2 to 5.

In another embodiment, the ethylene-based polymers may have molecular weight distribution, $M_w/M_n$, of less than 2, e.g., when chain transfer agents are used in the polymerization. All individual values and subranges less than 2 are included and disclosed herein. For example, the $M_w/M_n$ of the ethylene-based polymers may be less than 2, or in the alternative, less than 1.9, or in the alternative, less than 1.8, or in the alternative, less than 1.5. In a particular embodiment, the ethylene-based polymer has a molecular weight distribution from 0.5 to 2.

In one embodiment, the ethylene-based polymers can have a molecular weight ($M_w$) in the range of from equal to or greater than 20,000 g/mole, for example, in the range of from 20,000 to 1,000,000 g/mole, or in the alternative, from 20,000 to 350,000 g/mole, or in the alternative, from 100,000 to 750,000 g/mole.

In one embodiment, the ethylene-based polymers can have a melt index ($I_2$) in the range of 0.02 to 200 g/10 minutes. All individual values and subranges from 0.02 to 200 g/10 minutes are included herein and disclosed herein; for example, the melt index ($I_2$) can be from a lower limit of 0.1, 0.2, 0.5, 0.6, 0.8, 1, 1.5, 2.0, 2.5, 3.0, 3.5, 4.0, 4.5, 5.0, 10, 15, 20, 30, 40, 50, 60, 80, 90, 100, or 150 g/10 minutes, to an upper limit of 0.9, 1, 1.5, 2.0, 2.5, 3.0, 3.5, 4.0, 4.5, 5.0, 10, 15, 20, 30, 40, 50, 60, 80, 90, 100, 150, or 200 g/10 minutes.

In one embodiment, the ethylene-based polymers can have a melt flow ratio ($I_{10}/I_2$) in the range of from 5 to 30. All individual values and subranges from 5 to 30 are included herein and disclosed herein; for example, the melt flow ratio ($I_{10}/I_2$) can be from a lower limit of 5, 5.5, 6, 6.5, 8, 10, 12, 15, 20, or 25 to an upper limit of 5.5, 6, 6.5, 8, 10, 12, 15, 20, 25, or 30.

The ethylene-based polymers may comprise less than 50 mole percent of units derived from one or more α-olefin comonomers. All individual values and subranges from less than 50 mole percent are included herein and disclosed herein; for example, the ethylene-based polymers may comprise from less than 30 mole percent of units derived from one or more α-olefin comonomers; or in the alternative, less than 20 mole percent of units derived from one or more α-olefin comonomers; or in the alternative, from 1 to 20 mole percent of units derived from one or more α-olefin comonomers; or in the alternative, from 1 to 10 mole percent of units derived from one or more α-olefin comonomers.

The α-olefin comonomers typically have no more than 20 carbon atoms or comprise $C_3$-$C_{20}$ moiety. For example, the α-olefin comonomers may have 3 to 10 carbon atoms, and in other embodiments have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may be selected from the group including, but not limited to propylene, 1-butene, 1-hexene, and 1-octene; or in the alternative, from the group consisting of 1-hexene and 1-octene.

While the polymerization catalyst described herein typically produce copolymer, they can be used to produce homopolymers. The homopolymer may comprise an ethylene as the base monomer or in a separate polymer chain, or the homopolymer may comprise an α-olefin, such as the α-olefins described in the preceding paragraph.

The ethylene-based polymers may comprise greater than 50 mole percent of units derived from ethylene. All individual values and subranges from greater than 50 mole percent are included herein and disclosed herein; for example, the ethylene-based polymers may comprise at least 52 mole percent of units derived from ethylene; or in the alternative, at least 65 percent by weight of units derived from ethylene; or in the alternative, at least 85 mole percent of units derived from ethylene; or in the alternative, from 50 to 100 mole percent of units derived from ethylene; or in the alternative, from 80 to 100 mole percent of units derived from ethylene.

In one embodiment, the ethylene-based polymer comprises an olefin block copolymer prepared according to an aforementioned chain-shuttling polymerization process. The olefin block copolymer or poly(ethylene alpha-olefin) block copolymer comprises an ethylene-derived hard segment (i.e., polyethylene hard segment) and a soft segment comprising residuals from the alpha-olefin and ethylene. The residuals of the alpha-olefin and ethylene typically are approximately randomly distributed in the soft segment. Additionally, the polyethylene hard segment is characterizable as having less than 5 mole percent (mol %) of a residual of the alpha-olefin covalently incorporated therein. The poly(ethylene alpha-olefin) block copolymer is characterizable as having a melting temperature of greater than 100 degrees Celsius, and in some embodiments greater than 120° C., as determined by Differential Scanning Calorimetry using the procedure described later. The poly(ethylene alpha-olefin) block copolymers comprise ethylene residuals and one or more copolymerizable α-olefin comonomer residuals (i.e., ethylene and one or more copolymerizable α-olefin comonomers in polymerized form). The poly(ethylene alpha-olefin) block copolymers are characterized by multiple blocks or segments of two or more polymerized monomer units differing in chemical or physical properties. That is, the ethylene/α-olefin interpolymers are block interpolymers, multi-block interpolymers or copolymers. The terms "interpolymer" and copolymer" are used interchangeably herein. In some embodiments, the multi-block copolymer can be represented by the following formula: (AB)n, where n is at least 1 or an integer greater than 1, such as 2, 3, 4, 5, 10, 15, 20, 30, 40, 50, 60, 70, 80, 90, 100, or higher, "A" represents a hard block or segment and "B" represents a soft block or segment. Multiple A blocks and B blocks are linked in a linear fashion, not in a branched or a star fashion.

"Hard" segments refer to blocks of polymerized units in which ethylene residuals are present in an amount greater than 95 weight percent, and in other embodiments greater than 98 weight percent in the poly(ethylene alpha-olefin) block copolymers. In other words, the comonomer (i.e., alpha-olefin) residuals content in the hard segments is less than 5 weight percent, or less than 2 weight percent. In some embodiments, the hard segments comprise all or substantially all ethylene residuals. The phrases "polyethylene hard segment" and "ethylene-derived hard segment" are synonymous and mean the hard segment portion of a poly(ethylene alpha-olefin) block copolymer.

"Soft" segments refer to blocks of polymerized units in which the comonomer (i.e., alpha-olefin) residuals content is greater than 5 weight percent, greater than 8 weight percent, greater than 10 weight percent, or greater than 15 weight percent in the poly(ethylene alpha-olefin) block copolymers. In some embodiments, the comonomer residuals content in the soft segments can be greater than 20 weight percent, greater than 25 eight percent, greater than 30 weight percent, greater than 35 weight percent, greater than 40 weight percent, greater than 45 weight percent, greater than 50 weight percent, or greater than 60 weight percent.

Polymerization Process

Any conventional polymerization processes may be employed to produce the polyolefin composition according to the present disclosure. Such conventional polymerization processes include, but are not limited to, solution polymerization process, particle forming polymerization process, and combinations thereof using one or more conventional reactors e.g. loop reactors, isothermal reactors, fluidized bed reactors, stirred tank reactors, batch reactors in parallel, series, and/or any combinations thereof.

In one embodiment, the polyolefin composition according to the present disclosure may, for example, be produced via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 120 to 300° C.; for example, from 160 to 215° C., and at pressures in the range of from 300 to 1500 psi; for example, from 400 to 750 psi. The residence time in solution phase polymerization process is typically in the range of from 2 to 30 minutes; for example, from 5 to 15 minutes. Ethylene, one or more solvents, one or more high temperature olefin polymerization catalyst systems, one or more co-catalysts and/or scavengers, and optionally one or more comonomers are fed continuously to the one or more reactors. Exemplary solvents include, but are not limited to, isoparaffins. For example, such solvents are commercially available under the name ISOPAR E from ExxonMobil Chemical Co., Houston, Tex. The resultant mixture of the ethylene-based polymer and solvent is then removed from the reactor and the ethylene-based polymer is isolated. Solvent is typically recovered via a solvent recovery unit, i.e. heat exchangers and vapor liquid separator drum, and is then recycled back into the polymerization system.

In one embodiment, the ethylene-based polymer may be produced via solution polymerization in a single reactor system, for example a single loop reactor system, wherein ethylene and optionally one or more α-olefins are polymerized in the presence of one or more high temperature olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more an olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more high temperature olefin polymerization catalyst systems, as described herein, in both reactors.

In one embodiment, the ethylene-based polymer may be made using a gas phase polymerization process, e.g., utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No.

839,380. These patents disclose gas phase polymerization processes wherein the polymerization medium is either mechanically agitated or fluidized by the continuous flow of the gaseous monomer and diluent.

A polymerization process may be affected as a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may optionally be removed in a cyclone and/or fine filter. The gas is passed through a heat exchanger wherein the heat of polymerization is removed, compressed in a compressor and then returned to the reaction zone.

The reactor temperature of the fluid bed process herein ranges from 30° C. or 40° C. or 50° C. to 90° C. or 100° C. or 110° C. or 120° C. In general, the reactor temperature is operated at the highest temperature that is feasible taking into account the sintering temperature of the polymer product within the reactor. In this fluid bed process, the polymerization temperature, or reaction temperature should be below the melting or "sintering" temperature of the polymer to be formed. Thus, the upper temperature limit in one embodiment is the melting temperature of the polyolefin produced in the reactor.

A slurry polymerization process can also be used. A slurry polymerization process generally uses pressures in the range of from 1 to 50 atmospheres and even greater and temperatures in the range of 0 OC to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and Metallocene-Based Polyolefins Vol. 2 pp. 322-332 (2000), the disclosure of which are incorporated herein to the extent permitted.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The inventive ethylene-based polymers may contain any amounts of additives. The ethylene-based polymers may compromise from about 0 to about 10 percent by the combined weight of such additives, based on the weight of the ethylene-based polymers and the one or more additives. The ethylene-based polymers may further compromise fillers, which may include, but are not limited to, organic or inorganic fillers. Such fillers, e.g. calcium carbonate, talc, $Mg(OH)_2$, can be present in levels from about 0 to about 20 percent, based on the weight of the inventive ethylene-based polymers and the one or more additives and/or fillers. The ethylene-based polymers may further be blended with one or more polymers to form a blend.

One or more features of the present disclosure are illustrated in view of the examples as follows:

EXAMPLES

Throughout the examples section, the following abbreviations are used. Me: methyl; Bn: benzyl; Ph: phenyl; i-Pr: iso-propyl; t-Bu: tert-butyl; Ts: toluene sulfonate; THF: tetrahydrofuran; $Et_2O$: diethyl ether; $CH_2Cl_2$: dichloromethane; $CHCl_3$: chloroform $CCl_4$: carbon tetrachloride; EtOH: ethanol; $CH_3CN$: acetonitrile; MeCN: acetonitrile; EtOAc: ethyl acetate; $C_6D_6$: deuterated benzene; Benzene-$d_6$: deuterated benzene; $CDCl_3$: deuterated chloroform; DMSO-$d_6$: deuterated dimethylsulfoxide; $Ph_2PH$: diphenylphosphine; $Cy_2PH$: dicyclohexylphosphine; $Cy_2PH$—$BH_3$: dicyclohexylphosphine-borane complex; $PPh_3$: triphenylphosphine; n-BuLi: n-butyl lithium; KHMDS: potassium hexamethyldisilazide; $Et_2NH$: diethylamin; $NEt_3$: triethylamine; MeI: methyl iodide; NaOH: sodium hydroxide; NaOCl: sodium hypochlorite; $NaHCO_3$: sodium bicarbonate; brine: saturated aqueous sodium chloride; $Na_2SO_4$: sodium sulfate; $MgSO_4$: magnesium sulfate; $PCl_5$: phosphorous pentachloride; $Ph_3PBr_2$: triphenylphosphine dibromide; $Ph_3PCl_2$: triphenylphosphine chloride; $SOCl_2$: thionylchloride; $AgNO_3$: silver nitrate; $N_2$: nitrogen gas; PhMe:toluene; NMR: nuclear magnetic resonance; HRMS: high resolution mass spectrometry; LRMS: low resolution mass spectrometry; mmol: millimoles; mL: milliliters; M: molar; min: minutes; h: hours; d: days. NMR spectra were recorded on Varian 400-MR and VNMRS-500 spectrometers. 1H NMR (proton NMR) data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1H$ NMR data are reported in ppm downfield from internal tetramethylsilane (TMS, 6 scale) using residual protons in the deuterated solvent as references. $^{13}C$ NMR (carbon NMR) data were determined with 1H decoupling, and the chemical shifts are reported in ppm versus tetramethylsilane.

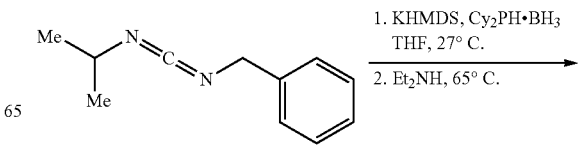

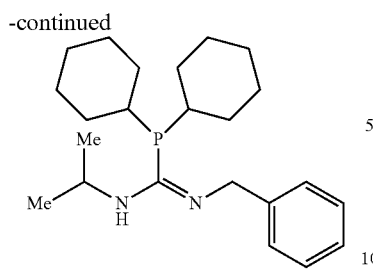

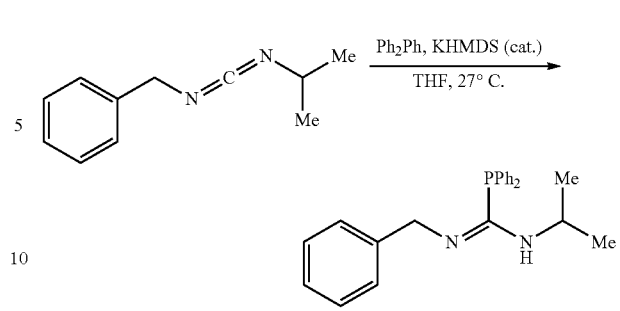

To a stirring (300 rpm) solution of the dicyclohexylphosphine-borane complex (245.6 mg, 1.152 mmol, 1.00 eq) in anhydrous de-oxygenated THF (8 mL) in a nitrogen filled glovebox at 27° C. was added a solution of KHMDS (0.46 mL, 0.2305 mmol, 0.20 eq, non-titrated 0.5 M in toluene). After 2 minutes a solution of the monocarbodiimide (200.8 mg, 1.152 mmol, 1.00 eq) in anhydrous de-oxygenated THF (3.5 mL) was added in a quick dropwise fashion. After 36 hours the pale yellow heterogeneous mixture was concentrated, suspended in anhydrous de-oxygenated hexanes (5 mL), concentrated, this process was repeated three times more to remove residual THF, the mixture was then re-suspended in hexanes (10 mL), stirred vigorously (1000 rpm) for 5 minutes, filtered through a 0.45 μm submicron PTFE filter, rinsed with hexanes (3×3 mL), and concentrated to afford the phosphaguanidine-borane complex as a white solid.

The crude white solid was suspended in anhydrous de-oxygenated Et$_2$NH (15 mL) and placed in a mantle heated to 65° C. After stirring (500 rpm) for 5 days the white heterogeneous mixture was removed from the mantle, allowed to cool to 27° C., concentrated, suspended in anhydrous de-oxygenated hexanes (5 mL), concentrated, this process was repeated three times more to remove residual Et$_2$H, the mixture was then re-suspended in hexanes (10 mL), stirred vigorously (1000 rpm) for 5 minutes, filtered through a 0.45 μm submicron PTFE filter, rinsed with hexanes (3×3 mL), and concentrated to afford the phosphaguanidine as a white solid (379.7 mg, 1.019 mmol, 88%). NMR results indicated that the product exists as a mixture of isomers and tautomers and contains trace impurities. The isomers and tautomers are indicated by an asterisk (*).

$^1$H NMR (500 MHz, Benzene-d$_6$) δ 7.56 (dddt, J=7.0, 4.0, 1.5, 0.8 Hz, 1H), 7.29-7.21 (m, 2H), 7.15-7.00 (m, 2H), 5.25 (d, J=5.3 Hz, 2H) (4.54 (d, J=5.2 Hz, 2H)*), (4.75-4.63 (m, 1H)*) 4.49-4.39 (m, 1H), (3.99-3.92 (m, 1H)*) 3.91-3.80 (m, 1H), 1.82-1.38 (m, 16H), 1.35 (dd, J=6.2, 0.7 Hz, 6H) (1.08 (d, J=6.5 Hz, 6H)*), 1.31-1.09 (m, 6H).

$^{31}$P NMR (202 MHz, Benzene-d$_6$) δ (−3.71*), (−8.94*), −21.53, (−28.14*).

$^{13}$C NMR (126 MHz, Benzene-d$_6$) δ (159.85 (d, J=8.6 Hz)*) 157.09 (d, J=39.1 Hz) (154.93 (d, J=38.7 Hz)*) (154.82 (d, J=25.0 Hz)*), (143.58*) (142.28*) 140.94, (128.31*) 128.19, (128.09*) 127.98 (127.93*), 126.76 (125.83*), 55.72 (d, J=38.1 Hz) (55.14 (d, J=24.8 Hz)*), (51.27 (d, J=38.2 Hz)*) (45.25 (d, J=22.1 Hz)*), (45.81*) 42.03, 34.01 (d, J=16.8 Hz), 31.16 (d, J=18.6 Hz) (30.99 (d, J=18.1 Hz)*), (30.02 (d, J=9.7 Hz)*) 29.85 (d, J=9.0 Hz), (26.91 (d, J=7.7 Hz)*) 26.87 (d, J=7.7 Hz), 26.75 (26.65*), 26.22 (26.84*), (25.51*), 22.60.

To a clear colorless solution of diphenylphosphine (500.0 mg, 0.46 mL, 2.689 mmol, 1.00 eq) in anhydrous de-oxygenated THF (6 mL) at 27° C. in a nitrogen filled glovebox was added a solution of KHMDS (1.10 mL, 0.5378 mmol, 0.20 eq, non-titrated 0.5 M in toluene). After stirring for 2 minutes a solution of the carbodiimide (468.6 mg, 2.689 mmol, 1.00 eq) in THF (6 mL, rinse 3×2 mL) was added in a quick dropwise fashion. The now clear red-orange solution was allowed to stir (300 rpm) for 48 hours upon which it was diluted with anhydrous de-oxygenated hexanes (10 mL), concentrated, suspended in hexanes (5 mL), concentrated, this process was repeated three times more to remove residual THF, the orange mixture was re-suspended in hexanes (10 mL), stirred vigorously (1000 rpm) for 5 minutes, filtered through a 0.45 μm submicron PTFE filter, washed with hexanes (3×3 mL), and concentrated. The resultant opaque viscous pale yellow oil was suspended in hexanes (5 mL), filtered through a 0.20 μm submicron PTFE filter, rinsed three times with 3 mL of hexanes, and then concentrated to afford the monophosphaguanidine as a clear pale yellow oil (909.9 mg, 2.524 mmol, 94%). NMR results indicated that the product exists as a complex mixture of isomers and tautomers and contains trace impurities. The isomers and tautomers are denoted by an asterisk (*).

$^1$H NMR (400 MHz, Benzene-d$_6$) δ 7.50 ((dq, J=7.7, 2.7 Hz, 1H)*) 7.48-7.43 (m, 2H), 7.42-7.35 (m, 3H), 7.17 (t, J=7.6 Hz, 2H), 7.08-6.88 (m, 8H), 5.02 (d, J=4.6 Hz, 2H) (4.47 (d, J=5.3 Hz, 2H)*), (4.42 (ddd, J=12.1, 6.1, 2.3 Hz, 1H)*) 4.35 (dt, J=13.0, 6.5 Hz, 1H), (4.14 (t, J=5.4 Hz, 1H)*) 3.82 (d, J=6.8 Hz, 1H), (1.23 (d, J=6.1 Hz, 6H)*) 0.92 (d, J=6.4 Hz, 6H).

$^{31}$P NMR (162 MHz, Benzene-d$_6$) δ (−14.96*), −17.16 (−18.48*).

$^{13}$C NMR (101 MHz, Benzene-d$_6$) δ 155.61 (d, J=32.0 Hz) (152.95 (d, J=32.5 Hz)*), 142.74 (140.23*), 134.83 (134.69*), (134.23*) 134.10, 133.99 (d, J=19.8 Hz) (133.96 (d, J=19.8 Hz)*), 129.10 (129.03*), 128.79 (d, J=6.9 Hz) (128.70 (d, J=6.9 Hz)*), 127.57 (127.52*), (126.57*) 125.91, 55.22 (d, J=34.5 Hz) (51.86 (d, J=34.3 Hz)*), (45.87*) 42.79, (24.99*) 22.22.

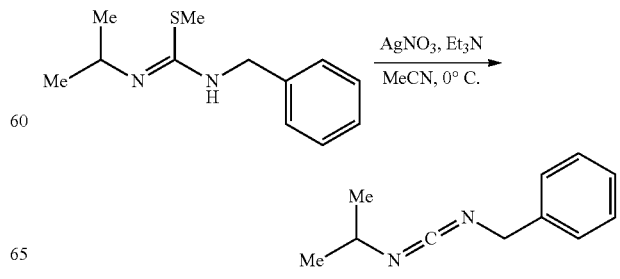

A solution of the isothiourea (4.168 g, 18.746 mmol, 1.00 eq) and Et₃N (2.087 g, 2.90 mL, 20.867 mmol, 1.10 eq) in acetonitrile (190 mL) in an oven-dried brown jar protected from light was placed in an ice water bath for 30 minutes upon which solid AgNO₃ (3.344 g, 19.684 mmol, 1.05 eq) was added all at once. After stirring (500 rpm) for 2 hours the now golden yellow heterogeneous mixture was diluted with hexanes (100 mL), stirred vigorously (1000 rpm) for 2 minutes, removed from the cold bath, suction filtered cold over a pad of celite, concentrated to approximately 20 mL, diluted with hexanes (50 mL), concentrated, this process was repeated three times more to remove residual acetonitrile, the now golden yellow heterogenous mixture was suspended in hexanes (50 mL), suction filtered over a pad of celite, and concentrated to afford the monocarbodiimide as a clear pale yellow oil (2.628 g, 15.082 mmol, 81%). NMR indicated pure product.

$^1$H NMR (500 MHz, Chloroform-d) δ 7.38-7.26 (m, 6H), 4.34 (s, 2H), 3.48 (hept, J=6.5 Hz, 1H), 1.09 (d, J=6.4 Hz, 6H).

$^{13}$C NMR (126 MHz, Chloroform-d) δ 138.71, 128.55, 127.71, 127.47, 50.73, 49.04, 24.48.

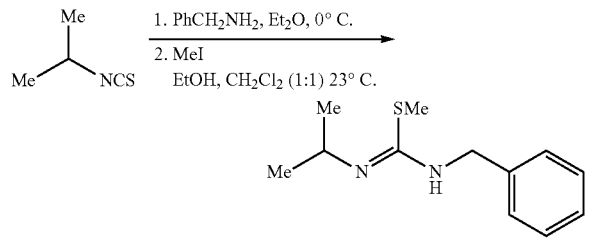

To a stirring (500 rpm) solution of the isothiocyanate (1.896 g, 2.00 mL, 18.737 mmol, 1.00 eq) in Et₂O (100 mL) was added benzylamine (2.008 g, 2.05 mL, 18.737 mmol, 1.00 eq) neat via syringe in a slow dropwise manner. After 12 hours the clear pale yellow solution was concentrated to afford the thiourea as an off-white solid (3.904 g, 18.737 mmol, 100%). NMR indicated pure product which was used in the subsequent reaction without further purification.

To a stirring (500 rpm) solution of the crude thiourea (3.904 g, 18.737 mmol, 1.00 eq) in CH₂Cl₂-EtOH (100 mL, 1:1) was added iodomethane (10.638 g, 4.70 mL, 74.948 mmol, 4.00 eq) neat via syringe in a quick dropwise manner. After 12 hours the clear pale yellow solution was neutralized with a saturated aqueous mixture of NaHCO₃ (100 mL), aqueous NaOH (15 mL, 1 N) was then added, the biphasic mixture was stirred vigorously (1000 rpm) for 2 minutes, poured into a separatory funnel, partitioned, organics were washed with a saturated aqueous mixture of NaHCO₃ (3×50 mL), residual organics were extracted from the aqueous layer using CH₂Cl₂ (2×25 mL), combined, dried over solid Na₂SO₄, decanted, and concentrated to afford the crude methylisothiourea (4.165 g, 18.730 mmol, 100%). NMR indicated product exists as a mixture of isomers. The crude methylisothiourea was used in the subsequent reaction without further purification.

Characterization Data for the Thiourea:

$^1$H NMR (500 MHz, Chloroform-d) δ 7.36-7.25 (m, 5H), 6.23 (s, 1H), 5.82 (s, 1H), 4.60 (s, 2H), 4.17 (s, 1H), 1.15 (d, J=6.5 Hz, 6H).

$^{13}$C NMR (126 MHz, Chloroform-d) δ 180.61, 136.99, 127.87, 127.57, 48.35, 46.22, 22.52.

Characterization Data for the Methylisothiourea:

$^1$H NMR (400 MHz, Chloroform-d) δ 7.39-7.33 (m, 3H), 7.30 (d, J=7.8 Hz, 2H), 7.22 (t, J=7.1 Hz, 1H), 4.52 (br s, 2H), 3.97 (br s, 1H), 2.38 (s, 3H), 1.18 (d, J=6.3 Hz, 6H).

$^{13}$C NMR (101 MHz, Chloroform-d) δ 151.32, 141.04, 128.24, 127.39, 126.46, 52.22, 45.01, 23.49, 14.46.

To a stirring (300 rpm) solution of the dicyclohexylphosphine-borane complex (246.2 mg, 1.155 mmol, 1.00 eq) in anhydrous de-oxygenated THF (8 mL) in a nitrogen filled glovebox at 27° C. was added a solution of KHMDS (0.46 mL, 0.2310 mmol, 0.20 eq, non-titrated 0.5 M in toluene). After 2 minutes a solution of the monocarbodiimide (272.9 mg, 1.155 mmol, 1.00 eq) in anhydrous de-oxygenated THF (3.5 mL) was added in a quick dropwise fashion. After 48 hours the pale yellow heterogeneous mixture was concentrated, suspended in anhydrous de-oxygenated hexanes (5 mL), concentrated, this process was repeated three times more to remove residual THF, the mixture was then re-suspended in hexanes (10 mL), stirred vigorously (1000 rpm) for 5 minutes, filtered through a 0.45 μm submicron PTFE filter, rinsed with hexanes (3×3 mL), and concentrated to afford the phosphaguanidine-borane complex as a white solid.

The crude white solid was suspended in anhydrous de-oxygenated Et₂NH (15 mL) and placed in a mantle heated to 65° C. After stirring (500 rpm) for 5 days the white heterogeneous mixture was removed from the mantle, allowed to cool to 27° C., concentrated, suspended in anhydrous de-oxygenated hexanes (5 mL), concentrated, this process was repeated three times more to remove residual Et₂NH, the mixture was then re-suspended in hexanes (10 mL), stirred vigorously (1000 rpm) for 5 minutes, filtered through a 0.45 μm submicron PTFE filter, rinsed with hexanes (3×3 mL), and concentrated to afford the phosphaguanidine as a white solid (481.1 mg, 1.108 mmol, 96% two steps). NMR indicated product exists as an isomeric mixture which contains trace impurities.

$^1$H NMR (500 MHz, Benzene-d₆) δ 7.03 (d, J=7.4 Hz, 4H), 7.01-6.94 (m, 3H), 6.89 (t, J=7.4 Hz, 1H), 4.66 (d, J=7.6 Hz, 1H), 4.26 (s, 2H), 2.23 (s, 6H), 2.07-1.86 (m, 6H), 1.62 (dd, J=50.5, 10.6 Hz, 4H), 1.25 (d, J=73.2 Hz, 12H).

$^{31}$P NMR (162 MHz, Benzene-d₆) δ −3.96.

$^{13}$C NMR (126 MHz, Benzene-d₆) δ 158.90, 148.01, 139.97, 128.28, 128.21, 127.98, 127.93, 126.93, 122.12, 47.07, 33.65 (d, J=13.8 Hz), 30.83 (d, J=12.3 Hz), 29.53 (d, J=11.2 Hz), 27.17 (d, J=9.2 Hz), 27.11 (d, J=10.5 Hz), 26.45, 19.09.

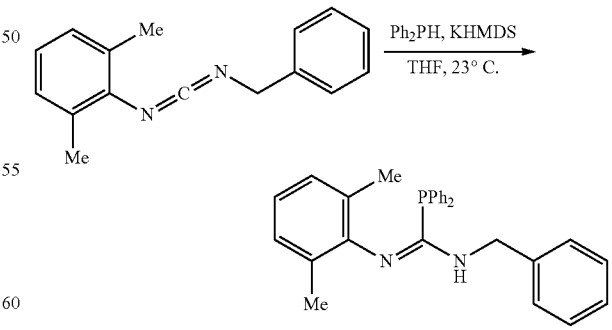

To a clear colorless solution of diphenylphosphine (190.5 mg, 0.18 mL, 1.023 mmol, 1.00 eq) in anhydrous de-oxygenated THF (3 mL) at 27° C. in a nitrogen filled glovebox was added a solution of KHMDS (0.41 mL, 0.2046 mmol, 0.20 eq, non-titrated 0.5 M in toluene). After stirring for 2 minutes a solution of the carbodiimide (241.8 mg, 1.023 mmol, 1.00 eq) in THF (3 mL, rinse 3×1 mL) was added in a quick dropwise fashion. The now clear pale yellow solution was allowed to stir (300 rpm) for 48 hours upon which it was diluted with anhydrous de-oxygenated hexanes (10 mL), concentrated, suspended in hexanes (5 mL), concentrated, this process was repeated three times more to remove residual THF, the orange mixture was re-suspended in hexanes (10 mL), stirred vigorously (1000 rpm) for 5 minutes, filtered through a 0.45 μm submicron PTFE filter, washed with hexanes (3×3 mL), and concentrated. The resultant opaque viscous pale yellow oil was suspended in hexanes (5 mL), filtered through a 0.20 μm submicron PTFE filter, rinsed with hexanes (3×3 mL), and concentrated to afford the monophosphaguanidine as a clear pale yellow oil (227.7 mg, 0.5389 mmol, 53%).

$^1$H NMR (400 MHz, Benzene-$d_6$) δ 7.32 (td, J=7.4, 2.9 Hz, 4H), 7.15-7.04 (m, 4H), 7.04-6.87 (m, 10H), 4.85-4.70 (m, 1H), 4.43 (d, J=5.6 Hz, 2H), 2.04 (s, 6H).

$^{31}$P NMR (162 MHz, Benzene-$d_6$) δ −13.21.

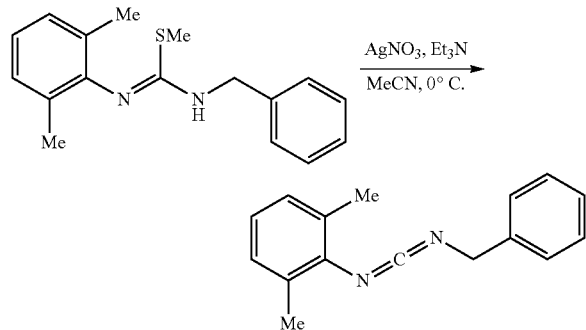

A solution of the thioguanidine (3.698 g, 13.002 mmol, 1.00 eq) and Et$_3$N (2.894 g, 4.00 mL, 28.604 mmol, 2.20 eq) in acetonitrile (130 mL) in an oven-dried brown jar protected from light was placed in an ice water bath for 30 minutes upon which solid AgNO$_3$ (4.528 g, 26.654 mmol, 2.05 eq) was added all at once. After stirring (500 rpm) for 2 hours hexanes (150 mL) was added to the canary yellow heterogeneous mixture, stirred vigorously (1000 rpm) for 2 minutes, suction filtered over a pad of celite, concentrated to approximately 10 mL, further diluted with hexanes (50 mL), concentrated to approximately 10 mL, this process was repeated three times more to remove residual acetonitrile, the now yellow heterogeneous mixture was diluted with hexanes (50 mL), suction filtered over a pad of celite, and concentrated to afford the monocarbodiimide as a clear pale yellow oil (1.781 g, 7.536 mmol, 58%). NMR indicated pure product.

$^1$H NMR (400 MHz, Chloroform-d) δ 7.39 (d, J=4.3 Hz, 4H), 7.35-7.29 (m, 1H), 7.00 (d, J=7.9 Hz, 2H), 6.93 (dd, J=8.5, 6.3 Hz, 1H), 4.55 (s, 2H), 2.26 (s, 6H).

$^{13}$C NMR (101 MHz, Chloroform-d) δ 138.04, 136.34, 134.33, 132.32, 128.67, 128.07, 127.62, 127.50, 124.27, 50.57, 18.84.

To a stirring (500 rpm) solution of the isothiocyanate (2.000 g, 1.85 mL, 12.252 mmol, 1.00 eq) in Et$_2$O (125 mL) at 23° C. was added benzylamine (1.313 g, 1.34 mL, 12.252 mmol, 1.00 eq) neat via syringe in a dropwise manner. After 12 hours the clear colorless solution was concentrated to afford the thiourea as an off-white solid (3.310 g, 12.252 mmol, 100%). NMR indicated pure product. The solid thiourea was used in the subsequent reaction without further purification.

To a stirring (500 rpm) solution of the thiourea (3.285 g, 12.149 mmol, 1.00 eq) in EtOH—CH$_2$Cl$_2$ (100 mL, 1:1) at 23° C. was added iodomethane (6.898 g, 3.10 mL, 48.596 mmol, 4.00 eq) neat via syringe. After 12 hours the clear pale yellow solution was neutralized with a saturated aqueous mixture of NaHCO$_3$ (100 mL), aqueous NaOH (15 mL, 1 N) was then added, the biphasic mixture was stirred vigorously (1000 rpm) for 2 minutes, poured into a separatory funnel, partitioned, organics were washed with a saturated aqueous mixture of NaHCO$_3$ (3×50 mL), residual organics were extracted from the aqueous layer using CH$_2$Cl$_2$ (2×25 mL), combined, dried over solid Na$_2$SO$_4$, decanted, and concentrated to afford the methylisothiourea as a pale yellow solid (3.450 g, 12.149 mmol, 100%).

Characterization Data for the Crude Methylisothiourea:

$^1$H NMR (500 MHz, Chloroform-d) δ 7.36 (d, J=5.5 Hz, 3H), 7.33-7.27 (m, 2H), 7.04-6.98 (m, 2H), 6.87 (t, J=7.5 Hz, 1H), 4.74-4.46 (m, 3H), 2.45-2.34 (m, 3H), 2.12 (s, 6H).

$^{13}$C NMR (126 MHz, Chloroform-d) δ 152.80, 146.31, 138.75, 129.32, 128.63, 127.90, 127.55, 127.45, 122.71, 47.09, 18.07, 13.80.

Characterization Data for the Thiourea:

$^1$H NMR (500 MHz, Chloroform-d) δ 7.65 (s, 1H), 7.32-7.27 (m, 2H), 7.26-7.22 (m, 3H), 7.16 (dd, J=8.5, 6.5 Hz, 1H), 7.10 (d, J=7.5 Hz, 2H), 5.72-5.54 (m, 1H), 4.85 (d, J=5.4 Hz, 2H), 2.26 (s, 6H).

$^{13}$C NMR (126 MHz, Chloroform-d) δ 181.26, 137.63, 137.30, 132.68, 129.04, 128.67, 127.63, 127.51, 49.17, 18.10.

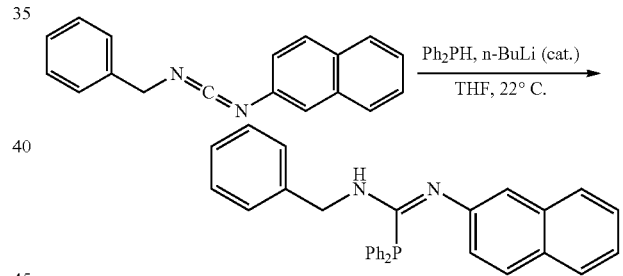

To a clear colorless solution of diphenylphosphine (0.756 g, 0.71 mL, 4.064 mmol, 1.00 eq) in anhydrous de-oxygenated THF (5 mL) in a nitrogen filled glovebox at 22° C. was added a solution of n-butyl lithium (n-BuLi) (85.0 μL, 0.2032 mmol, 0.05 eq, titrated 2.40 M in hexanes). The now red-orange solution was allowed to stir (300 rpm) for 1 minute upon which a solution of the monocarbodiimide (1.050 g, 4.064 mmol, 1.00 eq) in THF (15 mL) in a quick dropwise manner. After stirring (300 rpm) for 48 hours the now canary yellow solution was concentrated, suspended in anhydrous de-oxgyenated toluene (3 mL), concentrated, the resultant mixture was suspended in toluene (3 mL), concentrated, this process was repeated 2× more, the resultant mixture was suspended in toluene (3 mL), stirred vigorously (1000 rpm) for 2 minutes, then filtered through a 0.45 μm PTFE submicron filter, rinsed with toluene (3×2 mL), and concentrated to afford the phosphaguanidine as an amorphous solid (1.682 g, 3.784 mmol, 93%). NMR results indicated that the product was pure.

$^1$H NMR (500 MHz, Benzene-$d_6$) δ 7.53 (dd, J=8.0, 1.2 Hz, 1H), 7.47 (t, J=7.6 Hz, 2H), 7.31 (dtd, J=7.5, 4.8, 2.5 Hz, 5H), 7.25-7.21 (m, 1H), 7.16 (ddd, J=8.1, 6.8, 1.3 Hz, 1H), 7.13-7.05 (m, 6H), 7.03-6.96 (m, 1H), 6.95-6.87 (m, 7H), 4.79 (t, J=5.5 Hz, 1H), 4.55 (d, J=5.4 Hz, 2H).
$^{31}$P NMR (202 MHz, Benzene-d$_6$) δ −14.13.
$^{13}$C NMR (126 MHz, Benzene-d$_6$) δ 157.58 (d, J=37.3 Hz), 149.04 (d, J=12.4 Hz), 139.28, 134.48, 134.35 (d, J=3.9 Hz), 134.11 (d, J=20.4 Hz), 130.28, 129.16, 128.66 (d, J=7.5 Hz), 128.01, 127.59, 127.09, 126.96, 125.64, 124.36, 123.63, 118.55 (d, J=3.1 Hz), 46.11.

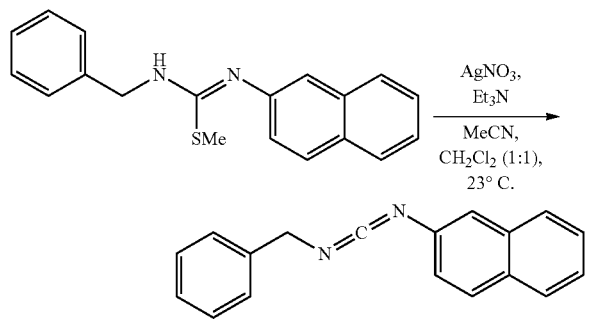

To a purple solution of the crude isothiourea (1.473 g, 4.807 mmol, 1.00 eq) and Et$_3$N (0.535 g, 0.74 mL, 5.288 mmol, 1.10 eq) in acetonitrile-CH$_2$Cl$_2$ (90 mL, 1:1) at 23° C. in an oven-dried brown jar was added solid AgNO$_3$ (0.857 g, 5.047 mmol, 2.00 eq) all at once. After stirring (500 rpm) for 1.5 hours the brown heterogeneous mixture was diluted with toluene (100 mL), stirred vigorously (1000 rpm) for 2 minutes, suction filtered over a pad of celite, concentrated to approximately 10 mL, toluene (25 mL) was added, the black mixture was concentrated to approximately 10 mL, this process was repeated two more times to remove residual acetonitrile, CH$_2$Cl$_2$, and to triturate residual silver and ammonium salts, the resultant black heterogeneous mixture was diluted with toluene (25 mL), suction filtered through a pad of celite, and concentrated to afford the monocarbodiimide as a tan red solid (1.084 g, 4.200 mmol, 87%). NMR had indicated product with trace impurities and toluene.
$^1$H NMR (500 MHz, Chloroform-d) δ 7.79-7.76 (m, 1H), 7.74 (dd, J=8.7, 0.7 Hz, 1H), 7.72-7.68 (m, 1H), 7.48-7.43 (m, 1H), 7.43-7.38 (m, 6H), 7.36-7.31 (m, 1H), 7.15 (dd, J=8.7, 2.2 Hz, 1H), 4.62 (d, J=0.5 Hz, 2H).
$^{13}$C NMR (126 MHz, Chloroform-d) δ 137.87, 137.46, 137.38, 133.95, 131.03, 129.21, 128.85, 127.89, 127.68, 127.47, 127.14, 126.52, 125.20, 123.14, 120.66, 50.63. HRMS (ESI): calc'd C$_{18}$N$_{14}$N$_2$[M+H]$^+$ as 259.1230; found 259.1222.

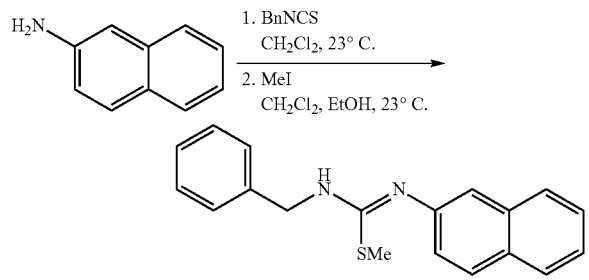

To a solution of 2-naphthylamine (1.104 g, 7.250 mmol, 1.00 eq) in CH$_2$Cl$_2$ (50 mL) at 23° C. was added benzylisothiocyanate (1.082 g, 0.96 mL, 7.250 mmol, 1.00 eq) neat via syringe. After stirring (300 rpm) for 24 hours the clear pale purple solution was concentrated, suspended in toluene (25 mL), heated to reflux, the now dark purple-black solution was allowed to gradually cool to 23° C., the resultant heterogeneous mixture was placed in the freezer (−20° C.) for 12 hrs, suction filtered cold, the resultant purple-black solid was washed with toluene (3×5 mL), collected, and dried in vacuo to afford the thiourea (1.544 g, 5.280 mmol, 73%).

To a dark heterogeneous mixture of the thiourea in CH$_2$Cl$_2$-EtOH (100 mL) at 23° C. was added iodomethane (2.998 g, 1.30 mL, 21.120 mmol, 4.00 eq). After stirring (500 rpm) for 20 hours the dark purple solution was neutralized with a saturated aqueous mixture of NaHCO$_3$ (100 mL), stirred vigorously (1000 rpm) for 2 minutes, poured into a separatory funnel, partitioned, organics were washed with a saturated aqueous mixture of NaHCO$_3$ (2×50 mL), residual organics were extracted from the aqueous layer using CH$_2$Cl$_2$ (2×20 mL), combined, dried over solid Na$_2$SO$_4$, decanted, and concentrated to afford the crude methyl thioguanidine as a black solid (1.473 g, 4.807 mmol, 91%). The crude, impure thioguanidine was used in the subsequent reaction without further purification.
$^1$H NMR (500 MHz, Chloroform-d) δ 7.79 (d, J=8.7 Hz, 2H), 7.75 (dd, J=8.2, 1.1 Hz, 1H), 7.46-7.29 (m, 7H), 7.18 (dd, J=8.6, 2.1 Hz, 1H), 4.82 (s, 1H), 4.59 (s, 2H), 2.31 (s, 3H).
$^{13}$C NMR (126 MHz, Chloroform-d) δ 147.14, 138.43, 134.43, 130.20, 128.75, 127.78, 127.67, 127.59, 127.10, 125.94, 124.07, 123.37, 117.98, 47.38, 14.13. HRMS (ESI): calc'd C$_{19}$H$_{18}$N$_2$S [M+H]$^+$ as 307.1224; found 307.1201.

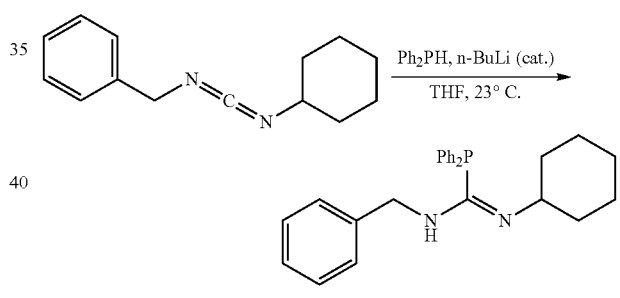

To a clear colorless solution of diphenylphosphine (0.174 g, 0.16 mL, 0.9332 mmol, 1.00 eq) in anhydrous de-oxygenated THF (5 mL) in a nitrogen filled glovebox at 23° C. was added n-BuLi (20.0 uL, 0.0467 mmol, 0.05 eq, titrated 2.40 M solution in toluene) causing the initial solution to change to a clear red-orange solution. After stirring (300 rpm) for 2 minutes a solution of the monocarbodiimide (0.200 g, 0.9332 mmol, 1.00 eq) in THF (5 mL) was added in a quick dropwise manner. After stirring for 48 hours the pale golden yellow solution was concentrated, suspended in anhydrous de-oxygenated hexanes (5 mL), concentrated, this process was repeated three times more, the resultant golden yellow solid mixture was suspended in hexanes (10 mL), stirred vigorously (1000 rpm) for 2 minutes, filtered through a 0.45 am submicron PTFE filter, rinsed with hexanes (3×3 mL), and concentrated to afford the phosphaguandine as a clear pale yellow viscous oil (0.355 g, 0.8864 mmol, 95%). NMR indicated pure product as a mixture of isomers. The asterisk (*) denotes the minor isomers.
$^1$H NMR (500 MHz, Benzene-d$_6$) δ 7.46-7.36 (m, 5H), 7.16 (t, J=7.7 Hz, 2H), 7.07-6.88 (m, 8H), 5.04 (d, J=4.6 Hz, 2H) (4.47 (d, J=5.3 Hz, 1H)*), 4.25-4.16 (m, 1H) (4.16-4.07 (m, 1H)*), (4.26-4.17 (m, 1H)*) 3.96 (d, J=7.1 Hz, 1H), 1.92-1.78 (m, 2H), 1.74-1.63 (m, 2H), (1.45 (dd, J=11.1, 4.7 Hz, 1H)*) 1.34-1.20 (m, 2H), 1.15 (dtt, J=13.1, 9.8, 3.3 Hz, 2H), 1.01-0.86 (m, 2H).

$^{31}$P NMR (202 MHz, Benzene-$d_6$) δ (−14.96*), −16.83, (−18.56*).

$^{13}$C NMR (126 MHz, Benzene-$d_6$) δ 155.40 (d, J=31.5 Hz) (153.09 (d, J=32.3 Hz)*), 142.74, (140.28)*, (134.91 (d, J=14.3 Hz)*) 134.28 (d, J=13.3 Hz), 134.03 (d, J=20.0 Hz) (133.91 (d, J=20.0 Hz)*), 129.10 (129.00*), 128.79 (d, J=6.7 Hz) (128.69 (d, J=6.7 Hz)*), 128.17 (128.07*), 127.93 (127.51*), (126.56*) 125.90, (59.90 (d, J=33.1 Hz)*) 55.28 (d, J=34.8 Hz), (49.05*) 45.92, 35.37 (32.38*), (26.01*) 25.74, (24.79*) 24.16.

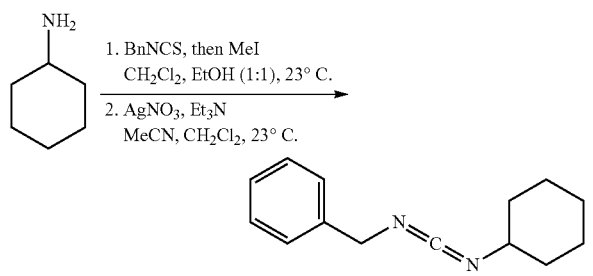

To a solution of benzylisothiocyanate (2.250 g, 2.00 mL, 15.079 mmol, 1.00 eq) in CH$_2$Cl$_2$ (50 mL) was added neat cyclohexylamine (1.495 g, 1.70 mL, 15.079 mmol, 1.00 eq) via syringe. After stirring (300 rpm) for 24 hours at 23° C. EtOH (50 mL) was added following which iodomethane (3.211 g, 1.40 mL, 22.620 mmol, 2.00 eq) was added. After stirring for 24 hours at 23° C. the clear pale yellow solution was neutralized with a saturated aqueous mixture of NaHCO$_3$ (50 mL), following which aqueous NaOH (15 mL, 1 N) was added, the biphasic mixture was stirred vigorously (1000 rpm) for 2 minutes, poured into a separatory funnel, partitioned, organics were washed with a saturated aqueous mixture of NaHCO$_3$ (3×25 mL), residual organics were extracted from the aqueous layer using CH$_2$Cl$_2$ (2×20 mL), combined, dried over solid Na$_2$SO$_4$, decanted, and concentrated to afford the crude methylisothiourea as a clear golden yellow oil (3.740 g, 14.252 mmol, 95%). NMR indicated pure product which exists as a complex mixture of isomers. The crude material was used in the subsequent reaction without purification.

To a clear golden yellow solution of the crude isothiourea (3.740 g, 14.252 mmol, 1.00 eq) and Et$_3$N (1.586 g, 2.20 mL, 15.677 mmol, 1.10 eq) in acetonitrile-CH$_2$Cl$_2$ (150 mL, 1:1) in an oven-dried brown jar at 23° C. was added solid AgNO$_3$ (2.542 g, 14.965 mmol, 1.05 eq) was added all at once. After stirring (500 rpm) for 2 hours the canary yellow heterogeneous mixture was removed diluted with hexanes (100 mL), stirred vigorously (1000 rpm) for 2 minutes, suction filtered over a pad of celite, rinsed with hexanes (3×25 mL), concentrated to approximately 10 mL, hexanes (25 mL) was added, the dark yellow was concentrated to approximately 10 mL, this process was repeated two more times to remove residual acetonitrile, CH$_2$Cl$_2$, and to triturate residual silver and ammonium salts, the resultant dark yellow-brown heterogeneous mixture was diluted with hexanes (25 mL), suction filtered through a pad of celite, rinsed with hexanes (3×25 mL), and concentrated to afford the monocarbodiimide as a clear pale yellow oil (2.510 g, 11.712 mmol, 82%). NMR indicated pure product.

Characterization of the Thiourea:
$^1$H NMR (500 MHz, Chloroform-d) δ 7.39-7.27 (m, 5H), 6.16 (s, 1H), 5.79 (s, 1H), 4.61 (s, 2H), 3.84 (s, 1H), 1.94 (dq, J=12.6, 4.0 Hz, 2H), 1.64 (dt, J=13.8, 3.9 Hz, 2H), 1.56 (dq, J=12.2, 4.0 Hz, 1H), 1.37-1.27 (m, 2H), 1.14 (tt, J=15.3, 7.6 Hz, 3H).

$^{13}$C NMR (126 MHz, Chloroform-d) δ 180.54, 136.88, 128.92, 127.92, 127.54, 52.96, 48.38, 32.69, 25.31, 24.51.

Characterization of the Methylisothiourea:
$^1$H NMR (500 MHz, Chloroform-d) δ 7.34 (dt, J=14.8, 7.6 Hz, 4H), 7.23 (t, J=7.3 Hz, 1H), 4.49 (d, J=79.8 Hz, 2H), 4.04 (s, 1H), 3.64 (m, 1H), 2.38 (s, 3H), 2.09-1.80 (m, 2H), 1.72 (dt, J=13.4, 4.1 Hz, 2H), 1.62 (dt, J=13.0, 4.0 Hz, 1H), 1.37 (q, J=12.5 Hz, 2H), 1.20 (q, J=12.2 Hz, 3H).

$^{13}$C NMR (126 MHz, Chloroform-d) δ 150.83, 141.74, 128.23, 127.35, 126.42, 54.16, 50.70, 34.61, 25.81, 24.92, 14.44. HRMS (ESI): calc'd C$_{15}$H$_{22}$N$_2$S [M+H]$^+$ 263.1577; found 263.1655.

Characterization of the Monocarbodiimide:
$^1$H NMR (500 MHz, Chloroform-d) δ 7.38-7.24 (m, 6H), 4.35 (s, 2H), 3.15 (dp, J=8.3, 3.8 Hz, 1H), 1.72 (ddt, J=56.9, 13.0, 4.0 Hz, 6H), 1.55-1.48 (m, 1H), 1.31-1.09 (m, 6H).

$^{13}$C NMR (126 MHz, Chloroform-d) δ 140.72, 138.70, 128.55, 127.68, 127.43, 55.68, 50.72, 34.68, 25.37, 24.48. HRMS (ESI): calc'd C$_{14}$H$_{18}$N$_2$[M+H]$^+$ as 215.1543; found 215.1536.

Synthesis of MCI-1

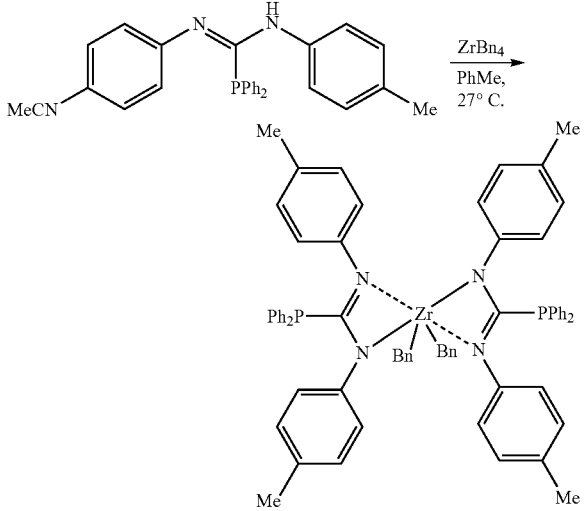

To a clear colorless solution of the phosphaguanidine (26.0 mg, 0.0637 mmol, 1.00 eq) in toluene (1.5 mL) in a nitrogen filled glovebox at 27° C. was added a solution of ZrBn$_4$ (14.5 mg, 0.0319 mmol, 0.50 eq) in toluene (0.5 mL). After stirring (300 rpm) for 3 hours the golden brown solution was filtered through a 0.45 μm submicron filter, the reaction vessel was rinsed with toluene (3×1.0 mL), and concentrated to afford the catalyst MCI-1 as a dark brown foam (30.4 mg, 0.0279 mmol, 88%).

$^1$H NMR (500 MHz, Benzene-$d_6$) δ 7.49 (d, J=7.7 Hz, 4H), 7.42 (t, J=7.6 Hz, 4H), 7.16 (ddt, J=8.4, 6.6, 1.5 Hz, 9H), 7.09 (d, J=15.5 Hz, 3H), 6.99-6.95 (m, 3H), 6.81-6.72 (m, 13H), 6.70 (d, J=8.0 Hz, 7H), 6.64 (d, J=8.0 Hz, 9H), 2.54 (s, 4H), 1.98 (s, 12H).

$^{31}$P NMR (202 MHz, Benzene-$d_6$) δ −4.04.

$^{13}$C NMR (126 MHz, Benzene-d$_6$) δ 183.73 (d, J=59.2 Hz), 144.08 (d, J=101.1 Hz), 134.62 (d, J=21.9 Hz), 133.44 (d, J=7.6 Hz), 132.52, 128.95 (d, J=9.6 Hz), 128.80, 128.15, 128.06, 127.93, 127.55, 124.91, 121.89, 79.26, 20.49.

Synthesis of MCI-6

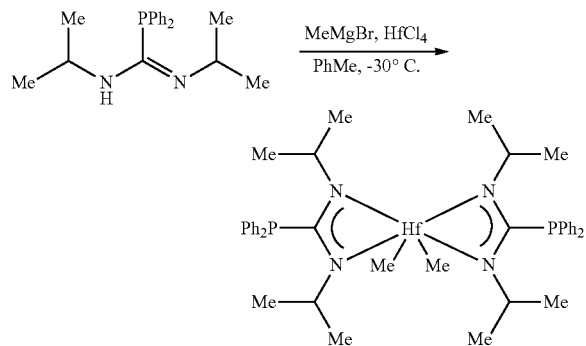

A suspension of HfCl$_4$ (17.2 mg, 0.0536 mmol, 1.00 eq) in toluene (1.0 mL) was placed in a −30° C. freezer in a nitrogen filled glove box for 1 hour upon which a MeMgBr (0.12 mL, 0.3485 mmol, 6.50 eq, 3.0 M in Et$_2$O) was added. The suspension was swirled and then after 2 minutes a precooled (−30° C. freezer for 1 hr) solution of the phosphoryl guanidine (33.5 mg, 0.1072 mmol, 2.00 eq) in toluene (1.0 mL, rinse 3×0.5 mL) was added. The suspension was allowed to stand in the freezer for 4 hours upon which the mixture was concentrated, suspended in hexanes (1.5 mL), and concentrated. This process is repeated twice more to triturate residual Mg salts, then suspended in toluene (1.0 mL, rinse 3×0.5 mL), filtered through a 0.45 μm filter, and concentrated. Any residual Mg salts were further triturated with hexanes (3×1.5 mL, and concentrated after each addition), then suspended in toluene (1.0 mL, rinse 3×0.5 mL), filtered through a 0.2 μm filter, and concentrated to afford the product as a white solid (40.0 mg, 0.0480 mmol, 90%).

$^1$H NMR (500 MHz, Benzene-d$_6$) δ 7.61 (tdd, J=7.5, 1.5, 1.0 Hz, 7H), 7.10-7.03 (m, 8H), 7.02-6.95 (m, 4H), 4.58-4.36 (m, 4H), 1.14 (d, J=6.4 Hz, 21H), 0.75 (s, 6H).

$^{31}$P NMR (202 MHz, Benzene-d$_6$) δ −20.00.

$^{13}$C NMR (126 MHz, Benzene-d$_6$) δ 177.72 (d, J=57.7 Hz), 133.43 (d, J=16.2 Hz), 132.22 (d, J=18.3 Hz), 128.66 (d, J=5.8 Hz), 128.46, 50.30, 49.92 (d, J=17.8 Hz), 24.67.

Synthesis of MCI-4

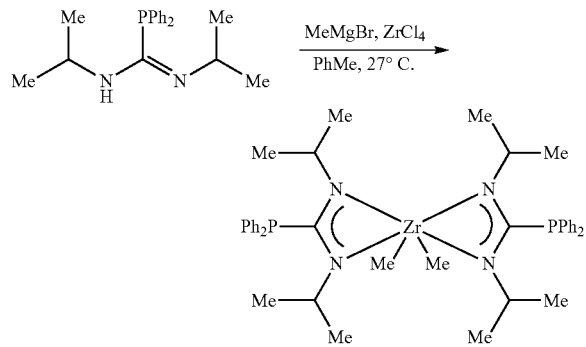

To a stirring (300 rpm) suspension of ZrCl$_4$ (11.2 mg, 0.0480 mmol, 1.00 eq) in toluene (0.5 mL) in a nitrogen filled glove box at 27° C. was added MeMgBr (0.11 mL, 0.3121 mmol, 6.50 eq, 3.0 M in Et$_2$O). After 20 seconds a solution of the phosphoryl guanidine (30.0 mg, 0.0960 mmol, 2.00 eq) in toluene (0.5 mL, rinse 3×0.5 mL) was added. The dark brown/black suspension was allowed to stir for 4 hours upon which the mixture was filtered through a 0.45 am filter, concentrated, suspended in hexanes (1.5 mL), and concentrated. The mixture was suspended in hexanes (1.5 mL) and concentrated twice more, then suspended in toluene (1.0 mL), filtered through a 0.45 am filter, the original vial was rinsed with toluene (3×1.0 mL), filtered, and concentrated. Any residual Mg salts were further triturated with hexanes (3×1.5 mL, and concentrated after each addition), then suspended in toluene (1.0 mL), filtered through a 0.45 μm submicron filter, the suspension was rinsed with toluene (3×1.0 mL), filtered, and concentrated. This process was repeated again to afford the product as a pale yellow solid (28.9 mg, 0.0348 mmol, 73%, 90% pure).

$^1$H NMR (500 MHz, Benzene-d$_6$) δ 7.63 (tdd, J=7.5, 1.6, 1.0 Hz, 8H), 7.09-7.03 (m, 8H), 7.01-6.96 (m, 4H), 4.37-4.22 (m, 4H), 1.13 (d, J=6.4 Hz, 24H), 1.03 (s, 6H).

$^{13}$C NMR (126 MHz, Benzene-d$_6$) δ 178.20 (d, J=58.2 Hz), 133.67, 132.14 (d, J=18.1 Hz), 128.67 (d, J=5.8 Hz), 128.38, 50.06 (d, J=17.2 Hz), 44.79, 24.56.

$^{31}$P NMR (202 MHz, Benzene-d$_6$) δ −20.22.

Synthesis of MCI-7

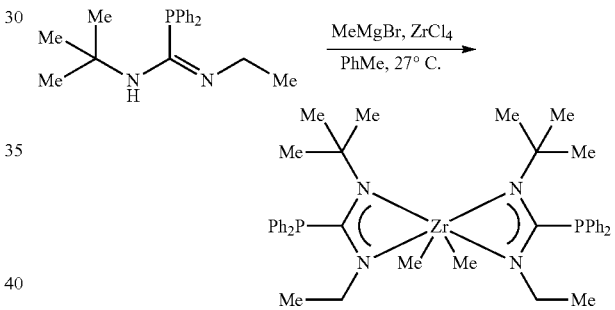

To a stirring (300 rpm) suspension of ZrCl$_4$ (14.9 mg, 0.0640 mmol, 1.00 eq) in toluene (0.5 mL) in a nitrogen filled glove box at 27° C. was added MeMgBr (0.17 mL, 0.5120 mmol, 8.00 eq, 3.0 M in Et$_2$O). After 20 seconds a solution of the phosphoryl guanidine (40.0 mg, 0.1280 mmol, 2.00 eq) in toluene (0.5 mL, rinse 3×0.5 mL) was added. The dark brown/black suspension was allowed to stir for 4 hours upon which the mixture was filtered through a 0.45 μm filter, the original reaction vessel was rinsed with toluene (3×1.0 mL), filtered, concentrated, suspended in hexanes (1.5 mL), and concentrated. The mixture was suspended in hexanes (1.5 mL) and concentrated twice more, then suspended in 1.0 mL of toluene and rinsed with 11.0 mL of toluene three times, filtered through a 0.45 μm submicron filter, and concentrated. Any residual Mg salts were further triturated with hexanes (3×1.5 mL, and concentrated after each addition), then suspended in toluene (1.0 mL, rinsed 3×1.0 mL), filtered through a 0.2 am filter, and concentrated. This process was repeated once more to afford the product as a pale yellow solid (25.7 mg, 0.0345 mmol, 54%).

$^1$H NMR (500 MHz, Benzene-d$_6$) δ 7.64 (m, 12H), 7.11-7.06 (m, 5H), 7.04-6.94 (m, 3H), 3.51 (q, J=7.0 Hz, 4H), 1.64 (d, J=1.0 Hz, 9H), 1.64 (s, 3H), 0.84 (s, 3H), 0.50 (t, J=6.9 Hz, 6H).

$^{13}$C NMR (101 MHz, Benzene-d$_6$) δ 178.82 (d, J=68.6 Hz), 131.61 (d, J=17.5 Hz), 128.70 (d, J=5.7 Hz), 128.17, 53.73 (d, J=3.9 Hz), 44.83, 42.21, 31.65 (d, J=12.9 Hz), 15.22.

$^{31}$P NMR (202 MHz, Benzene-d$_6$) δ −13.52.

Synthesis of MCI-8

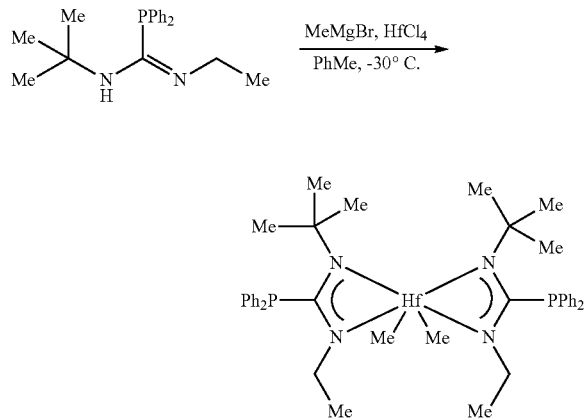

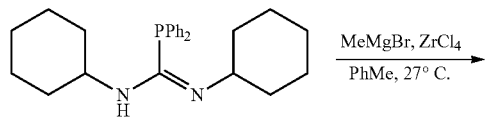

A suspension of HfCl$_4$ (22.8 mg, 0.0710 mmol, 1.00 eq) in toluene (1.0 mL) was placed in a −30° C. freezer in a nitrogen filled glove box for 1 hour upon which a MeMgBr (154.0 μL, 0.4168 mmol, 6.50 eq, 3.0 M in Et$_2$O) was added. The suspension was swirled and then after 2 minutes a precooled (−30° C. freezer for 1 hr) solution of the phosphoryl guanidine (44.4 mg, 0.1421 mmol, 2.00 eq) in toluene (1.0 mL, rinse 3×0.5 mL) was added. The suspension was allowed to stand in the freezer for 4 hours upon which the mixture was filtered cold through a 0.2 am filter, concentrated, suspended in hexanes (1.5 mL), and concentrated. The mixture was suspended in hexanes (1.5 mL) and concentrated twice more, then suspended in toluene (1.0 mL), filtered through a 0.45 μm filter, rinsed with toluene (3×1.0 mL), and concentrated. Any residual Mg salts were further triturated with hexanes (3×1.5 mL, and concentrated after each addition), then suspended in toluene (1.0 mL), filtered through a 0.2 μm submicron filter, rinsed with toluene (3×1.0 mL), and concentrated to afford the hafnium catalyst MCI-9 as a white solid (51.3 mg, 0.0585 mmol, 82%, 95% pure by $^1$H- and $^{31}$P-NMR).

$^1$H NMR (500 MHz, Benzene-d$_6$) δ 7.61 (s, 8H), 7.11-7.06 (m, 8H), 7.02-6.98 (m, 4H), 3.56 (d, J=7.4 Hz, 4H), 1.65 (d, J=1.0 Hz, 18H), 0.59 (s, 6H), 0.46 (t, J=6.9 Hz, 6H).

$^{31}$P NMR (202 MHz, Benzene-d$_6$) δ −12.74.

$^{13}$C NMR (126 MHz, Benzene-d$_6$) δ 178.72 (d, J=67.8 Hz), 133.96 (d, J=19.8 Hz), 131.70 (d, J=17.5 Hz), 128.69 (d, J=5.8 Hz), 128.23, 53.63 (d, J=4.7 Hz), 48.47, 44.47, 31.82 (d, J=13.0 Hz), 28.39, 15.18.

Synthesis of MCI-5

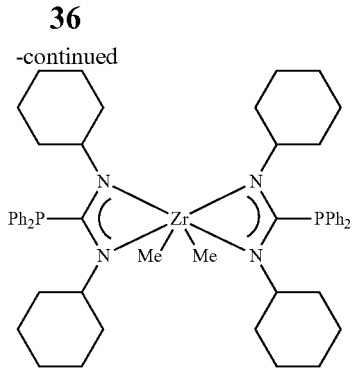

To a stirring (300 rpm) suspension of ZrCl$_4$ (12.9 mg, 0.0554 mmol, 1.00 eq) in toluene (0.5 mL) in a nitrogen filled glove box was added MeMgBr (0.15 mL, 0.4432 mmol, 8.00 eq, 3.0 M in Et$_2$O). After 20 seconds a solution of the phosphoryl guanidine (43.5 mg, 0.1108 mmol, 2.00 eq) in toluene (0.5 mL, rinse 3×0.5 mL) was added. The dark brown/black suspension was allowed to stir for 4 hours upon which the mixture was filtered through a 0.45 μm filter, the original vessel was rinsed with toluene (3×1.0 mL), concentrated, suspended in hexanes (1.5 mL), and concentrated. The mixture was suspended in hexanes (1.5 mL) and concentrated twice more, then suspended in toluene (1.0 mL, rinsed with toluene 3×1.0 mL), filtered through a 0.45 μm submicron filter, and concentrated. Any residual magnesium salts were further triturated with hexanes (3×1.5 mL, and concentrated after each addition), then suspended in toluene (1.0 mL), filtered through a 0.45 μm submicron filter, rinsed with toluene (3×1.0 mL) and concentrated. This process was repeated once more to afford the catalyst MCI-5 as a pale yellow solid (28.9 mg, 0.0348 mmol, 73%).

$^1$H NMR (500 MHz, Benzene-d$_6$) δ 7.69 (tt, J=7.5, 1.3 Hz, 9H), 7.11-7.07 (m, 7H), 7.01-6.96 (m, 4H), 3.92 (tq, J=10.1, 4.8 Hz, 4H), 1.87-1.70 (m, 17H), 1.57 (d, J=13.2 Hz, 10H), 1.42 (d, J=12.6 Hz, 4H), 1.11 (s, 6H), 1.05 (tt, J=12.5, 3.3 Hz, 3H), 0.95 (tt, J=13.0, 3.7 Hz, 6H).

$^{31}$P NMR (202 MHz, Benzene-d$_6$) δ −20.82.

$^{13}$C NMR (126 MHz, Benzene-d$_6$) δ 178.46 (d, J=58.2 Hz), 133.93 (d, J=16.2 Hz), 132.11 (d, J=18.2 Hz), 128.67 (d, J=6.0 Hz), 128.35, 58.09 (d, J=16.3 Hz), 45.50, 35.23, 25.75, 25.61.

Synthesis of MCI-2

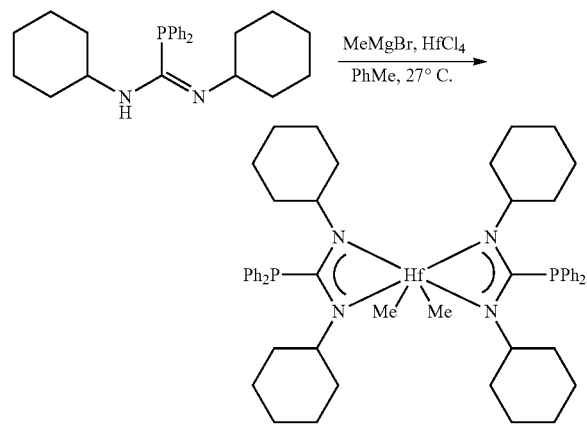

To a stirring (300 rpm) suspension of HfCl$_4$ (20.4 mg, 0.0637 mmol, 1.00 eq) in toluene (1.0 mL) in a nitrogen filled glove box was added MeMgBr (0.17 mL, 0.5095 mmol, 8.00 eq, 3.0 M in Et$_2$O). After 30 seconds a solution of the phosphoryl guanidine (50.0 mg, 0.1274 mmol, 2.00 eq) in toluene (1.0 mL) was added. The sides of the vial were rinsed with toluene (0.5 mL) and the resultant pale yellow suspension was allowed to stir for 4 hours upon which the mixture was filtered through a 0.45 µm filter, the original reaction vessel was rinsed with PhMe (3×1.0 mL), concentrated, suspended in hexanes (1.5 mL), and concentrated. The mixture was suspended in hexanes (1.5 mL) and concentrated twice more, then suspended in toluene (1.0 mL, rinsed 3×1.0 mL), filtered through a 0.45 µm filter, and concentrated. Any residual Mg salts were further triturated with hexanes (3×1.5 mL, and concentrated after each addition), then suspended in toluene (1.0 mL, rinsed 3×1.0 mL)), filtered through a 0.2 µm filter, and concentrated to afford the catalyst MCI-2 as a pale yellow solid (70.1 mg, 0.0608 mmol, 86%).

$^1$H NMR (500 MHz, Benzene-d$_6$) δ 7.67 (ddt, J=8.4, 7.5, 1.3 Hz, 8H), 7.11-7.06 (m, 8H), 7.01-6.96 (m, 4H), 4.09 (td, J=10.7, 5.5 Hz, 4H), 1.88-1.69 (m, 16H), 1.57 (d, J=13.1 Hz, 8H), 1.42 (d, J=13.1 Hz, 8H), 1.13-1.01 (m, 4H), 0.99-0.88 (m, 4H), 0.83 (s, 6H).

$^{13}$C NMR (126 MHz, Benzene-d$_6$) δ 177.70 (d, J=57.5 Hz), 134.20-133.50 (m), 132.20 (d, J=18.2 Hz), 128.67 (d, J=5.7 Hz), 128.44, 57.97 (d, J=17.0 Hz), 50.62, 35.33, 25.75, 25.56.

$^{31}$P NMR (202 MHz, Benzene-d$_6$) δ −20.58.

Synthesis of MCI-3

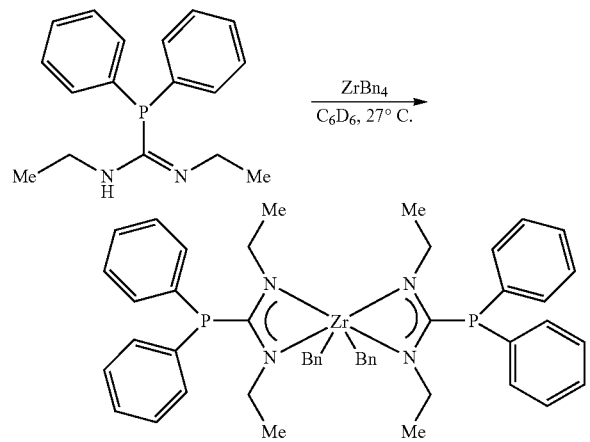

To a stirring (300 rpm) solution of the phosphoryl guanidine (45.4 mg, 0.1597 mmol, 2.00 eq) in C$_6$D$_6$ (0.5 mL) at 27° C. in a nitrogen filled glovebox was added a solution of ZrBn$_4$ (36.4 mg, 0.0798 mmol, 1.00 eq) in C$_6$D$_6$ (0.5 mL). After 2 hours the golden brown oil was filtered through a 0.45 µm submicron filter, rinsed with toluene (3×1.0 mL), concentrated to afford the catalyst MCI-3 as a golden yellow solid (67.0 mg, 0.0796 mmol, 100%).

$^1$H NMR (500 MHz, Benzene-d$_6$) δ 7.48-7.43 (m, 7H), 7.38-7.35 (m, 4H), 7.33-7.28 (m, 4H), 7.11-6.95 (m, 15H), 3.32 (qd, J=7.2, 2.0 Hz, 8H), 2.49 (s, 4H), 0.79-0.74 (m, 12H).

$^{31}$P NMR (202 MHz, Benzene-d$_6$) δ −20.11.

$^{13}$C NMR (126 MHz, Benzene-d$_6$) δ 180.29 (d, J=58.1 Hz), 145.39, 134.13, 133.34, 133.13 (d, J=19.1 Hz), 128.91, 128.72, 128.66 (d, J=6.6 Hz), 121.21, 72.78, 43.63 (d, J=15.4 Hz), 17.02.

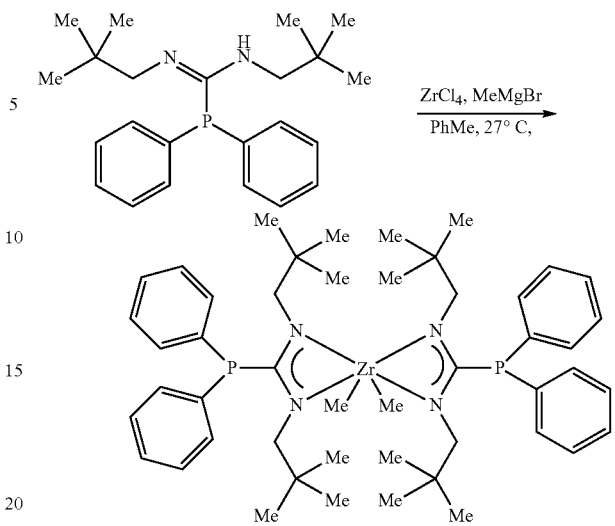

To a stirring (300 rpm) suspension of ZrCl$_4$ (15.8 mg, 0.0679 mmol, 1.00 eq) in toluene (0.5 mL) in a nitrogen filled glovebox at 27° C. was added MeMgBr (0.18 mL, 0.5427 mmol, 8.00 eq, 3.0 M in Et$_2$O). After 15 seconds a solution of the phosphoryl guanidine (50.0 mg, 0.1357 mmol, 2.00 eq) in toluene (0.5 mL) was added. After 20 hours the dark brown mixture was filtered through a 0.45 µm submicron filter (rinsed with toluene 3×1.0 mL), concentrated, suspended in hexanes (3.0 mL), concentrated, this was repeated 2× more, suspended in toluene (1.5 mL), filtered through a 0.45 µm submicron filter (rinsed with toluene 3×1.5 mL), and concentrated. This entire process was repeated twice more to triturate/remove any residual magnesium salts, and after concentration NMR had shown a mixture of SM, bis-[2,1] catalyst and undesired mono-[2,1] catalyst. The pale golden viscous foam was dissolved in toluene (0.5 mL) and hexanes (5 mL), and was slowly layered on top of the solution. The bilayer was quickly placed in the freezer (−30° C.) without disruption for 48 hours upon which a pale yellow solid crystallized out of solution. The liquid was quickly decanted/filtered cold through a 0.45 µm submicron filter, the remaining solid was washed with cold hexanes (3×1 mL), filtered, residual solid in the filter was dissolved in toluene (3 mL), combined with residual solid left from the recrystallization, and concentrated to afford the bis-[2,1] catalyst MCI-16 as a pale golden yellow solid (10.8 mg, 0.0126 mmol, 19%). N.

$^1$H NMR (500 MHz, Benzene-d$_6$) δ 7.69-7.63 (m, 8H), 7.08-7.03 (m, 8H), 7.01-6.95 (m, 4H), 3.67 (s, 8H), 0.99 (s, 6H), 0.93 (s, 36H).

$^{31}$p NMR (202 MHz, Benzene-d$_6$) δ −23.10.

$^{13}$C NMR (126 MHz, Benzene-d$_6$) δ 175.62 (d, J=60.9 Hz), 133.94 (d, J=15.7 Hz), 133.55 (d, J=20.0 Hz), 128.72 (d, J=2.8 Hz), 128.68, 60.59 (d, J=17.2 Hz), 48.38, 33.49, 28.12.

Synthesis of MCI-9

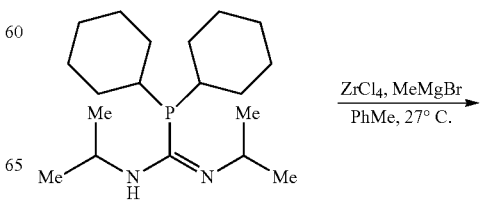

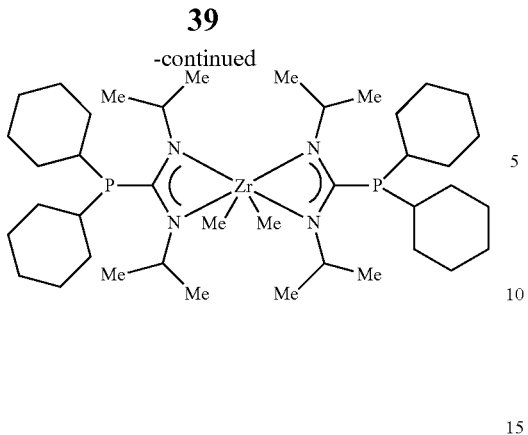

To a stirring (500 rpm) suspension of ZrCl$_4$ (10.8 mg, 0.0463 mmol, 1.00 eq) in anhydrous de-oxygenated PhMe (1.0 mL) at 27° C. in a nitrogen filled glovebox was added MeMgBr (0.10 mL, 0.3006 mmol, 6.50 eq, non-titrated 3.0 M in Et$_2$O). After 10 seconds a solution of the phosphaguanidine (30.0 mg, 0.0925 mmol, 2.00 eq) in PhMe (0.5 mL) was added to the now dark brown suspension. After 20 hrs the mixture was filtered through a 0.45 um PTFE submicron filter, rinsed with PhMe (3×1 mL), concentrated, suspended in hexanes (5 mL), concentrated, this was repeated 3× more, then suspended in PhMe (3 mL), filtered through a 0.45 um PTFE filter, rinsed with PhMe (3×1 mL), and concentrated. The pale yellow solid was suspended in hexanes (5 mL), concentrated, this was repeated 3× more, then suspended in PhMe (3 mL), filtered through a 0.20 um PTFE submicron filter, and concentrated to afford the catalyst as a pale yellow solid (32.1 mg, 0.0417 mmol, 90%, 90% pure by $^1$H-NMR). NMR had shown the product as ~90% pure with the starting material being the residual impurity. Attempts to remove the free ligand using triturations or recrystallizations from hexanes, pentane, Me$_4$Si, PhMe, or benzene failed due to high solubility of both the ligand and catalyst in these solvents.

$^1$H NMR (500 MHz, Benzene-d$_6$) δ 4.81 (m, 2H), 4.02 (m, 2H), 2.25 (m, 4H), 2.14 (m, 4H), 1.79 (br d, J=12.5 Hz, 4H), 1.76-1.68 (m, 4H), 1.69-1.61 (m, 4H), 1.55 (dd, J=11.0, 3.8 Hz, 4H), 1.48-1.34 (m, 34H), 1.27 (t, J=12.0 Hz, 2H), 1.23-1.09 (m, 8H), 0.93 (s, 6H).

$^{31}$P NMR (202 MHz, Benzene-d$_6$) δ −6.82.

$^{13}$C NMR (126 MHz, Benzene-d$_6$) δ 182.82 (d, J=59.0 Hz), 49.59, 44.42, 35.53 (d, J=17.3 Hz), 32.86 (d, J=23.0 Hz), 31.48 (d, J=11.9 Hz), 26.67, 26.58 (d, J=5.5 Hz), 26.08, 25.00.

Synthesis of MCI-10

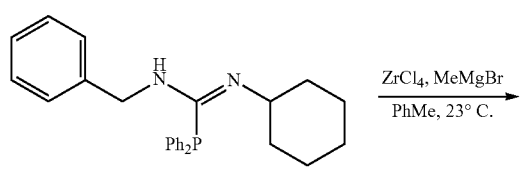

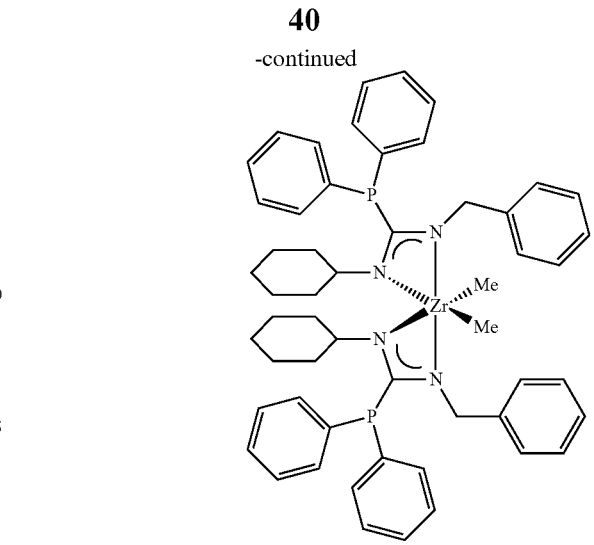

To a stirring (300 rpm) pale yellow heterogeneous mixture of ZrCl$_4$ (14.5 mg, 0.0624 mmol, 1.00 eq) in anhydrous de-oxgyenated PhMe (0.2 mL) was added MeMgBr (0.12 mL 0.3745 mmol, 6.00 eq, non-titrated 3.0 M in Et$_2$O). After stirring for 10 seconds a solution of the phosphaguanidine ligand (25.0 mg, 0.0624 mmol, 1.00 eq) in PhMe (0.87 mL) was added to the now dark brown mixture in a quick dropwise manner. After stirring for 2 hrs the mixture was filtered through a 0.45 μm submicron PTFE filter, rinsed with anhydrous de-oxgyenated benzene (3×3 mL), concentrated, suspended in hexanes (3 mL), concentrated, this was repeated 3× more to remove residual Et$_2$O and triturate magnesium salts, the resultant pale yellow solid mixture was suspended in benzene (5 mL), stirred vigorously (1000 rpm) for 2 mins, filtered through a 0.45 μm submicron PTFE filter, rinsed with anhydrous de-oxgyenated benzene (3×3 mL), concentrated, suspended in hexanes (3 mL), concentrated, this was repeated 3× more to remove residual Et$_2$O and triturate magnesium salts, the resultant pale yellow solid mixture was suspended in hexanes (5 mL), stirred vigorously (1000 rpm) for 2 mins, filtered through a 0.45 μm submicron PTFE filter, rinsed with anhydrous de-oxgyenated hexanes (3×3 mL), and concentrated to afford an off-white amorphous foam. The residual remaining white solid was dissolved in benzene (3 mL), filtered through the same 0.45 μm submicron PTFE filter, rinsed with benzene (3×3 mL), and concentrated to afford MCI-10 (23.3 mg, 0.0253 mmol, 81%).

$^1$H NMR (400 MHz, Benzene-d$_6$) δ 7.54-7.49 (m, 8H), 7.29-7.26 (m, 4H), 7.07-7.01 (m, 4H), 6.99-6.88 (m, 14H), 5.01 (d, J=2.8 Hz, 4H), 3.59 (ddt, J=10.9, 7.1, 3.6 Hz, 2H), 1.59-1.35 (m, 12H), 1.32-0.92 (m, 4H), 0.89 (s, 6H), 0.87-0.72 (m, 4H).

$^{31}$P NMR (162 MHz, Benzene-d$_6$) δ −19.67.

Synthesis of MCI-11

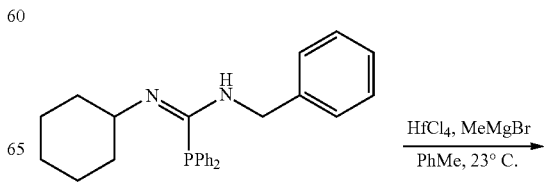

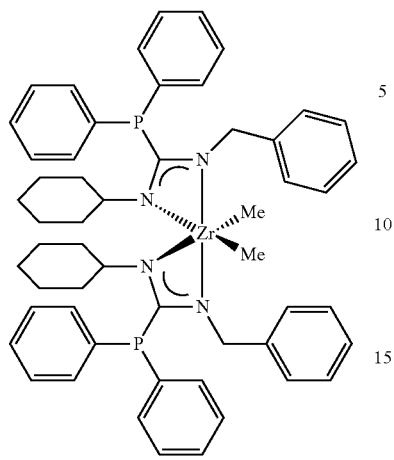

To a pale yellow heterogeneous mixture of HfCl$_4$ (8.7 mg, 0.0272 mmol, 1.00 eq) in anhydrous de-oxygenated PhMe (0.5 mL) in a nitrogen filled glovebox at 23° C. was added a solution of MeMgBr (75.0 uL, 0.2178 mmol, 8.00 eq, non-titrated 3.0 M in Et$_2$O). After stirring (300 rpm) for 10 seconds a solution of the phosphaguanidine (21.8 mg, 0.0544 mmol, 2.00 eq) in PhMe (1.0 mL) was added in a quick dropwise fashion. After stirring (400 rpm) for 2 hrs the dark golden yellow heterogeneous mixture was diluted with anhydrous de-oxygenated hexanes (3 mL), stirred vigorously (1000 rpm) for 2 mins, filtered through a 0.45 μm submicron PTFE filter, rinsed with hexanes (3×3 mL), concentrated, suspended in hexanes (3 mL), concentrated, this suspension/concentration process was repeated 3× more to remove residual Et$_2$O and triturate magnesium salts, the resultant pale yellow mixture was suspended in hexanes (3 mL), stirred vigorously (1000 rpm) for 1 min, filtered through a 0.45 μm submicron PTFE filter, rinsed with hexanes (3×3 mL), concentrated, and this concentration/filtration process was repeated 1× more to afford the hafnium phosphaguanidine precatalyst MCI-11 (11.0 mg, 0.0109 mmol, 40%) as a white amorphous foam. NMR indicated pure product.

$^1$H NMR (400 MHz, Benzene-d$_6$) δ 7.52-7.46 (m, 9H), 7.32-7.27 (m, 5H), 7.10 (d, J=1.3 Hz, 5H), 7.06-7.01 (m, 5H), 7.00-6.86 (m, 16H), 5.05 (d, J=2.8 Hz, 4H), 3.79-3.68 (m, 2H), 1.79-0.69 (m, 16H), 0.65 (s, 6H).

$^{31}$P NMR (162 MHz, Benzene-d$_6$) δ −18.98.

$^{13}$C NMR (101 MHz, Benzene-d$_6$) δ 180.51 (d, J=58.7 Hz), 141.96, 133.00 (d, J=14.4 Hz), 132.66 (d, J=19.1 Hz), 128.60, 128.54, 128.16, 127.76, 127.51, 126.03, 57.14 (d, J=9.2 Hz), 53.00 (d, J=20.8 Hz), 35.34, 25.55, 25.52.

Synthesis of MCI-12

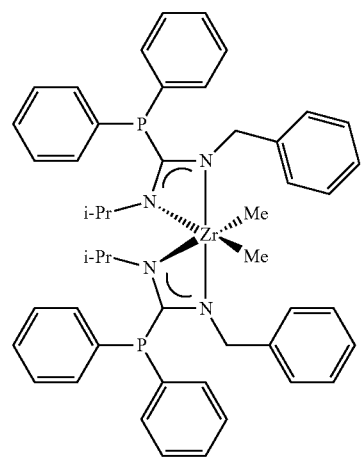

To a pale yellow heterogeneous mixture of ZrCl$_4$ (8.4 mg, 0.0361 mmol, 1.00 eq) in anhydrous de-oxygenated PhMe (0.5 mL) in a nitrogen filled glovebox at 23° C. was added a solution of MeMgBr (80.0 uL, 0.2347 mmol, 6.50 eq, non-titrated 3.0 M in Et$_2$O). After stirring (300 rpm) for 10 seconds a solution of the phosphaguanidine (26.0 mg, 0.0721 mmol, 2.00 eq) in PhMe (1.0 mL) was added in a quick dropwise fashion. After stirring (500 rpm) for 3 hrs the dark golden brown heterogeneous mixture was diluted with anhydrous de-oxygenated hexanes (3 mL), stirred vigorously (1000 rpm) for 2 mins, filtered through a 0.45 μm submicron PTFE filter, rinsed with hexanes (3×3 mL), concentrated, suspended in hexanes (3 mL), concentrated, this suspension/concentration process was repeated 3× more to remove residual Et$_2$O and triturate magnesium salts, the resultant pale yellow mixture was suspended in hexanes (3 mL), stirred vigorously (1000 rpm) for 1 min, filtered through a 0.45 μm submicron PTFE filter, rinsed with hexanes (3×3 mL), concentrated, and this concentration/filtration process was repeated 1× more to afford the zirconium phosphaguanidine precatalyst MCI-12 (26.4 mg, 0.0314 mmol, 87%) as a golden brown foam. NMR product with trace impurities.

$^1$H NMR (500 MHz, Benzene-d$_6$) δ 7.53-7.46 (m, 9H), 7.23-7.19 (m, 4H), 7.04 (t, J=7.6 Hz, 5H), 6.98-6.89 (m, 12H), 4.93-4.83 (m, 4H), 4.17 (pd, J=6.4, 4.5 Hz, 2H), 1.02 (d, J=6.3 Hz, 12H), 0.89 (s, 6H).

$^{31}$P NMR (202 MHz, Benzene-d$_6$) δ −19.83.

$^{13}$C NMR (126 MHz, Benzene-d$_6$) δ 180.41 (d, J=59.2 Hz), 141.98, 132.96 (d, J=14.3 Hz), 132.61 (d, J=18.9 Hz), 128.61 (d, J=6.6 Hz), 128.51, 128.17, 127.93, 127.74, 127.31, 125.97, 53.14 (d, J=16.5 Hz), 49.64 (d, J=14.9 Hz), 47.38, 24.62.

Synthesis of MCI-13

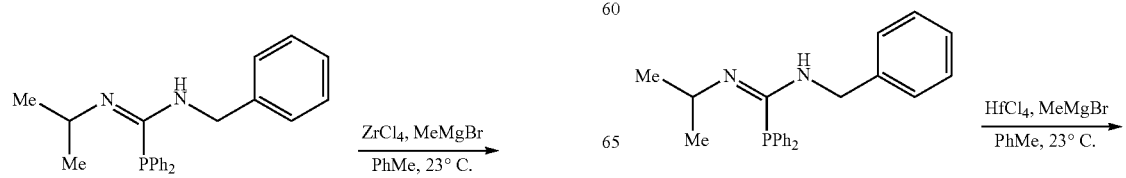

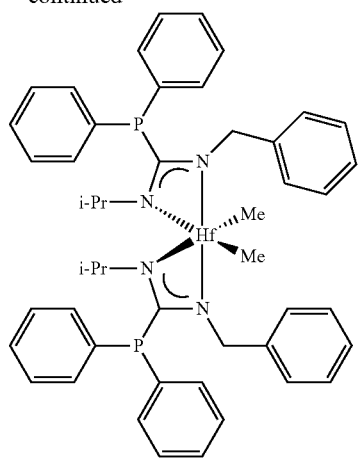

To a pale yellow heterogeneous mixture of HfCl$_4$ (8.9 mg, 0.0277 mmol, 1.00 eq) in anhydrous de-oxygenated PhMe (0.5 mL) in a nitrogen filled glovebox at 23° C. was added a solution of MeMgBr (60.0 uL, 0.1803 mmol, 6.50 eq, non-titrated 3.0 M in Et$_2$O). After stirring (300 rpm) for 10 seconds a solution of the phosphaguanidine (20.0 mg, 0.0555 mmol, 2.00 eq) in PhMe (1.0 mL) was added in a quick dropwise fashion. After stirring (400 rpm) for 2 hrs the dark golden yellow heterogeneous mixture was diluted with anhydrous de-oxygenated hexanes (3 mL), stirred vigorously (1000 rpm) for 2 mins, filtered through a 0.45 μm submicron PTFE filter, rinsed with Ph-H/hexanes (3×5 mL, 1:1), concentrated, suspended in hexanes (3 mL), concentrated, this suspension/concentration process was repeated 3× more to remove residual Et$_2$O and triturate magnesium salts, the resultant pale yellow mixture was suspended in PhH/hexanes (5 mL, 1:1), stirred vigorously (1000 rpm) for 1 min, filtered through a 0.45 μm submicron PTFE filter, rinsed with Ph-H/hexanes (3×3 mL, 1:1), concentrated, and this concentration/filtration process was repeated 1× more to afford the hafnium phosphaguanidine precatalyst MCI-13 (25.0 mg, 0.0269 mmol, 97%) as a pale yellow amorphous foam. NMR indicated pure product.

$^1$H NMR (500 MHz, Benzene-d$_6$) δ 7.48-7.43 (m, 7H), 7.26-7.22 (m, 4H), 7.03 (dd, J=8.4, 6.8 Hz, 4H), 6.98-6.88 (m, 12H), 5.00-4.90 (m, 4H), 4.30 (pd, J=6.4, 4.4 Hz, 2H), 1.02 (d, J=6.3 Hz, 12H), 0.65 (s, 6H).

$^{31}$P NMR (202 MHz, Benzene-d$_6$) δ −18.98.

$^{13}$C NMR (126 MHz, Benzene-d$_6$) δ 180.48 (d, J=58.4 Hz), 141.90, 132.77 (d, J=14.2 Hz), 132.68 (d, J=19.0 Hz), 128.61, 128.56, 127.73, 127.54, 127.32, 125.99, 52.91, 52.77, 49.46 (d, J=13.3 Hz), 24.55.

Synthesis of MCI-14

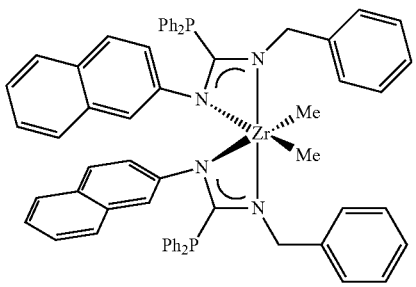

To a pale yellow heterogeneous mixture of ZrCl$_4$ (21.9 mg, 0.0940 mmol, 1.00 eq) in anhydrous de-oxygenated PhMe (1.0 mL) in a nitrogen filled glovebox at 23° C. was added a solution of MeMgBr (0.20 mL, 0.6110 mmol, 6.50 eq, non-titrated 3.0 M in Et$_2$O). After stirring (300 rpm) for 10 seconds a solution of the phosphaguanidine (83.6 mg, 0.1881 mmol, 2.00 eq) in PhMe (2.0 mL) was added in a quick dropwise fashion. After stirring (500 rpm) for 2 hrs the dark golden brown heterogeneous mixture was diluted with anhydrous de-oxygenated hexanes (3 mL), stirred vigorously (1000 rpm) for 2 mins, filtered through a 0.45 μm submicron PTFE filter, rinsed with hexanes (3×3 mL), concentrated, suspended in hexanes (3 mL), concentrated, this suspension/concentration process was repeated 3× more to remove residual Et$_2$O and triturate magnesium salts, the resultant pale yellow mixture was suspended in hexanes (3 mL), stirred vigorously (1000 rpm) for 1 min, filtered through a 0.45 μm submicron PTFE filter, rinsed with hexanes (3×3 mL), concentrated, and this concentration/filtration process was repeated 1× more to afford the zirconium phosphaguanidine precatalyst MCI-14 (66.0 mg, 0.0653 mmol, 69%) as a golden brown solid. NMR indicated product which contains rotamers as well as different precatalyst speciation as minor materials and hexanes.

Only Major Chemical Shifts are Listed Below:

$^1$H NMR (400 MHz, Benzene-d$_6$) δ 7.46-7.40 (m, 2H), 7.30-7.22 (m, 10H), 7.22-7.16 (m, 4H), 7.16-7.13 (m, 4H), 7.13-7.10 (m, 8H), 7.05 (ddt, J=10.7, 6.1, 2.2 Hz, 4H), 6.89 (dd, J=5.0, 2.0 Hz, 1H), 6.72-6.63 (m, 10H), 6.56 (td, J=7.4, 1.7 Hz, 1H), 4.63 (d, J=2.1 Hz, 4H), 0.96 (s, 6H).

$^{31}$P NMR (162 MHz, Benzene-d$_6$) δ −10.11.

$^{13}$C NMR (101 MHz, Benzene-d$_6$) δ 180.99 (d, J=58.9 Hz), 145.17, 144.36 (d, J=3.2 Hz), 141.23, 140.54, 133.73 (d, J=7.6 Hz), 133.49, 133.33 (d, J=20.1 Hz), 132.61 (d, J=11.5 Hz), 130.64, 130.61, 128.43, 128.24, 128.16, 128.09, 127.52, 127.29, 127.20, 126.47, 125.75, 125.48, 124.08, 121.91, 121.89, 53.20 (d, J=12.4 Hz), 50.96.

Synthesis of MCI-15

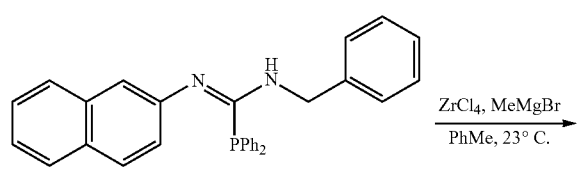

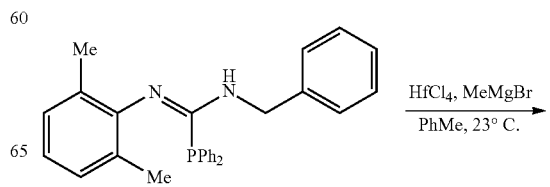

-continued

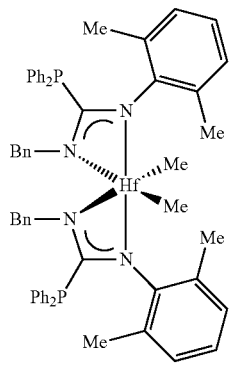

To a pale yellow heterogeneous mixture of HfCl$_4$ (15.7 mg, 0.0488 mmol, 2.00 eq) in anhydrous de-oxygenated PhMe (0.5 mL) in a nitrogen filled glovebox at 23° C. was added a solution of MeMgBr (80.0 µL, 0.2440 mmol, 10.00 eq, non-titrated 3.0 M in Et$_2$O). After stirring (300 rpm) for 20 seconds a solution of the phosphaguanidine (10.3 mg, 0.0244 mmol, 1.00 eq) in PhMe (1.5 mL) was added in a quick dropwise fashion. After stirring (500 rpm) for 2 hrs the dark golden brown heterogeneous mixture was diluted with anhydrous de-oxygenated hexanes (5 mL), stirred vigorously (1000 rpm) for 2 mins, filtered through a 0.45 am submicron PTFE filter, rinsed with PhMe-hexanes (3×5 mL, 2:1), concentrated, suspended in hexanes (3 mL), concentrated, this suspension/concentration process was repeated 3× more to remove residual Et$_2$O and triturate magnesium salts, the resultant pale yellow mixture was suspended in PhMe-hexanes (5 mL, 2:1), stirred vigorously (1000 rpm) for 1 min, filtered through a 0.45 am submicron PTFE filter, rinsed with PhMe-hexanes (3×5 mL, 2:1), concentrated, and this concentration/filtration process was repeated 1× more to afford the hafnium phosphaguanidine precatalyst MCI-15 (17.2 mg, 0.0217 mmol, 89%, ~90% pure) as a golden yellow foam. NMR indicated product that is ~90% pure which contains minor impurities.

$^1$H NMR (500 MHz, Benzene-d$_6$) δ 7.36-7.28 (m, 11H), 7.17 (d, J=7.6 Hz, 4H), 7.08 (d, J=7.6 Hz, 4H), 7.02 (t, J=7.3 Hz, 2H), 6.82 (ddd, J=4.7, 2.6, 1.5 Hz, 9H), 6.74 (s, 6H), 4.68 (s, 4H), 2.16 (s, 12H), 0.54 (s, 6H).

$^{31}$P NMR (202 MHz, Benzene-d$_6$) δ −7.28.

$^{13}$C NMR (126 MHz, Benzene-d$_6$) δ 183.54 (d, J=61.0 Hz), 144.27 (d, J=5.7 Hz), 140.63, 134.07 (d, J=21.2 Hz), 133.78, 132.48 (d, J=11.7 Hz), 128.96, 128.32, 128.26, 128.17, 127.93, 127.06, 126.25, 124.72, 57.40, 52.17 (d, J=4.5 Hz), 19.76, 19.72.

All solvents and reagents were obtained from commercial sources and used as received unless otherwise noted. Anhydrous toluene, hexanes, tetrahydrofuran, and diethyl ether were purified via passage through activated alumina and, in some cases, Q-5 reactant. Solvents used for experiments performed in a nitrogen-filled glovebox were further dried by storage over activated 4 Å molecular sieves. Glassware for moisture-sensitive reactions was dried in an oven overnight prior to use. NMR spectra were recorded on Varian 400-MR and VNMRS-500 spectrometers. LC-MS analyses were performed using a Waters e2695 Separations Module coupled with a Waters 2424 ELS detector, a Waters 2998 PDA detector, and a Waters 3100 ESI mass detector. LC-MS separations were performed on an XBridge C18 3.5 µm 2.1×50 mm column using a 5:95 to 100:0 acetonitrile to water gradient with 0.1% formic acid as the ionizing agent.

HRMS analyses were performed using an Agilent 1290 Infinity LC with a Zorbax Eclipse Plus C18 1.8 µm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. 13C NMR data were determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening was performed in a high throughput parallel polymerization reactor (PPR) system. The PPR system was comprised of an array of 48 single cell (6×8 matrix) reactors in an inert atmosphere glovebox. Each cell was equipped with a glass insert with an internal working liquid volume of approximately 5 mL. Each cell had independent controls for pressure and was continuously stirred at 800 rpm. Catalyst solutions, unless otherwise noted, were prepared in toluene. All liquids (i.e. solvent, 1-octene, chain shuttling agent solutions, and catalyst solutions) were added via robotic syringes. Gaseous reagents (i.e. ethylene, H$_2$) were added via a gas injection port. Prior to each run, the reactors were heated to 80° C., purged with ethylene, and vented.

A portion of Isopar-E was added, the reactors were heated to the run temperature, and then pressured to the appropriate psig with ethylene. Toluene solutions of reagents were then added in the following order: (1) 1-octene with 500 nmol of scavenger MMAO-3A; (2) activator (cocatalyst-1, cocatalyst-2, etc); and (3) Catalyst.

Each liquid addition was chased with a small amount of Isopar-E so that after the final addition, a total reaction volume of 5 mL reached. Upon addition of the catalyst, the PPR software began monitoring the pressure of each cell. The pressure (within approximately 2-6 psig) was maintained by the supplemental addition of ethylene gas by opening the valve at the set point minus 1 psi and closing it when the pressure reached 2 psi higher. All drops in pressure were cumulatively recorded as "Uptake" or "Conversion" of the ethylene for the duration of the run or until the uptake or conversion requested value was reached, whichever occurred first. Each reaction was then quenched by addition of 10% carbon monoxide in argon for 4 minutes at 40-50 psi higher than the reactor pressure. The shorter the "Quench Time", the more active the catalyst. In order to prevent the formation of too much polymer in any given cell, the reaction was quenched upon reaching a predetermined uptake level (50 psig for 120° C. runs, 75 psig for 150° C. runs). After all the reactors were quenched they were allowed to cool to 70° C. They were then vented, purged for 5 minutes with nitrogen to remove carbon monoxide, and the tubes removed. The polymer samples were then dried in a centrifugal evaporator at 70° C. for 12 hours, weighed to determine polymer yield and submitted for IR (1-octene incorporation) and GPC (molecular weight) analysis.

SymRAD HT-GPC Analysis

The molecular weight data was determined by analysis on a hybrid Symyx/Dow built Robot-Assisted Dilution High-Temperature Gel Permeation Chromatographer (Sym-RAD-GPC). The polymer samples were dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was then diluted to 1 mg/mL immediately before the injection of a 250 μL aliquot of the sample. The GPC was equipped with two Polymer Labs PLgel 10 am MIXED-B columns (300×10 mm) at a flow rate of 2.0 mL/minute at 160° C. Sample detection was performed using a PolyChar IR4 detector in concentration mode. A conventional calibration of narrow polystyrene (PS) standards was utilized with apparent units adjusted to homo-polyethylene (PE) using known Mark-Houwink coefficients for PS and PE in TCB at this temperature.

1-Octene Incorporation IR Analysis

The running of samples for the HT-GPC analysis preceded the IR analysis. A 48-well HT silicon wafer was utilized for deposition and analysis of 1-octene incorporation of samples. For the process, all additional heat that the samples were subject to was 160° C. with duration less than or equal to 210 minutes; samples had to be re-heated to remove magnetic GPC stir bars as well as shaken with glass-rod stir bars on a J-KEM Scientific heated robotic shaker. Samples then were deposited while being heated using a Tecan MiniPrep 75 deposition station, and the 1,2,4-trichlorobenzene was evaporated off the deposited wells of the wafer at 160° C. under nitrogen purge. The analysis of 1-octene was performed on the HT silicon wafer using a NEXUS 670 E.S.P. FT-IR.

Batch Reactor Polymerization Procedure

The batch reactor polymerizations were conducted in a 2 L Parr™ batch reactor. The reactor is heated by an electrical heating mantle, and is cooled by an internal serpentine cooling coil containing cooling water. Both the reactor and the heating/cooling system were controlled and monitored by a Camile™ TG process computer. The bottom of the reactor is fitted with a dump valve, which empties the reactor contents into a stainless steel dump pot, which is prefilled with a catalyst kill solution (typically 5 mL of a Irgafos/Irganox/toluene mixture). The dump pot was vented to a 30 gallon blow-down tank, with both the pot and the tank purged with nitrogen. All solvents used for polymerization or catalyst makeup were run through solvent purification columns to remove any impurities that may affect polymerization. The 1-octene and IsoparE were passed through 2 columns, the first containing A2 alumina, the second containing Q5. The ethylene was passed through 2 columns, the first containing A204 alumina and 4Å mol sieves, the second containing Q5 reactant. The $N_2$, used for transfers, was passed through a single column containing A204 alumna, 4Å mol sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when at reaction temperature to maintain reaction pressure set point. Ethylene addition amounts are monitored by a micro-motion flow meter.

The catalyst and activators were mixed with the appropriate amount of purified toluene to achieve a molarity solution. The catalyst and activators were handled in an inert glove box, drawn into a syringe and pressure transferred into the catalyst shot tank. This was followed by 3 rinses of toluene, 5 mL each. Immediately after catalyst addition the run timer begins. If ethylene was used, it was then added by the Camile to maintain reaction pressure set point in the reactor. These polymerizations were run for 10 min., then the agitator was stopped and the bottom dump valve opened to empty reactor contents to the dump pot. The dump pot contents were poured into trays placed in a lab hood where the solvent was evaporated off overnight. The trays containing the remaining polymer are then transferred to a vacuum oven, where they are heated up to 140° C. under vacuum to remove any remaining solvent. After the trays cool to ambient temperature, the polymers were weighed for yield/efficiencies, and submitted for polymer testing.

Chain Transfer Activity

Beyond activity and $M_w$, understanding the chain transfer capability of a new catalyst is one critical aspect for development of new polyolefin catalyst families at Dow. A catalyst's chain transfer ability is initially evaluated by running a campaign in which the level of chain shuttling agent (CSA) is varied to observe the depression in molecular weight and narrowing of the PDI expected for a shuttling catalyst. The molecular weight of polymer generated by catalysts with potential to be good chain shuttlers will be more sensitive to the addition of CSA than the polymer molecular weight generated by poorer shuttling catalysts. The Mayo equation (Equation 1) describes how a chain transfer agent decreases the number average chain length ($\overline{X_n}$) from the native number average chain length ($\overline{X_{n0}}$) where no chain transfer agent is present. Equation 2 defines a chain shuttling constant, Ca, as the ratio of chain transfer and propagation rate constants. By assuming that the vast majority of chain propagation occurs through ethylene insertion and not comonomer incorporation, Equation 3 describes the expected $M_n$ of a polymerization. $M_{n0}$ is the native molecular weight of the catalyst in the absence of chain shuttling agent and $M_n$ is the molecular weight that is observed with chain shuttling agent ($M_n=M_{n0}$ with no chain shuttling agent). We emphasize that Equation 3 ignores the contribution of chain growth from comonomer incorporation, thus it is only applicable for poor incorporating catalysts such as catalyst MCI-4, MCI-5, MCI-9, MCI-10, and MCI-12.

$$\frac{1}{\overline{X_n}} = \frac{1}{\overline{X_{n_0}}} + \frac{k_{tr}[\text{chain transfer agent}]}{k_p[\text{monomer}]} \qquad \text{Equation 1}$$

$$Ca = \frac{k_{tr}}{k_p} \qquad \text{Equation 2}$$

$$\frac{1}{Mn} = \frac{1}{Mn_0} + Ca\frac{[CSA]}{[\text{ethylene}] \times 28} \qquad \text{Equation 3}$$

To determine the chain shuttling rate for catalysts MCI-4 and MCI-5, a batch campaign was run using 0, 50, and 200 mmoles of $ZnEt_2$ and 1, 2, 4, 10, and 15 mmoles of catalyst. All reactions employed 1.2 equivalents of cocatalyst-1 as the activator. The batch campaign was conducted at 120° C. and 150° C. with 11.1 or 12.1 g of ethylene under a pressure of 76 to 136 psi, 56 g or 57 g of 1-octene, and 528 g or 555 g of IsoparE. The $M_n$ for each run was calculated using Equation 3 with the values of Ca and $M_{n0}$ fit using the Microsoft Excel Solver to minimize the squared deviations between the fitted and experimental molecular weight data for all the runs with a particular catalyst. Plots of $M_n$ versus [CSA] for catalysts MCI-4 and MCI-5 are shown in Figure 2 including a line showing the expected dependence of $M_n$ on [CSA] from the best fit value for Ca. This particular analysis does not confirm that the reversible chain transfer required for chain shuttling occurs for MCI-4 and MCI-5. However, the decrease in PDI as the CSA amount increases from 0 to 50 mmoles is promising evidence that catalyst MCI-4 and MCI-5 may undergo reversible chain transfer with diethyl zinc as opposed to irreversible chain transfer.

As described in the preceding paragraphs the catalysts in the following tables were individually reacted using the polymerization conditions in a single reactor system. Reaction conditions and the properties of the resulting polymers are reported in Tables 1, 2, 3, and 4.

TABLE 1

Batch Polymerization Data

| Catalyst name | μmol | Temp (° C.) | Octene (g) | Exotherm (° C.) | Ethylene (g) initial | Ethylene (g) added | Yield (g) | Efficiency (gpoly/gmetal) | Tm (° C.) | Mw | Mw/Mn | Octene mol % |
|---|---|---|---|---|---|---|---|---|---|---|---|---|
| MCI-4 | 1 | 120 | 300 | 2.6 | 46.1 | 12.6 | 19.8 | 217,048 | 132.831 | 357,591 | 2.186 | 1 |
|  | 2.75 | 150 | 300 | 3.0 | 43.1 | 16.4 | 17.7 | 70,556 | 128.847 | 84,994 | 2.544 | 0.5 |
| MCI-7 | 1 | 120 | 300 | 1.6 | 46.1 | 3.3 | 6.8 | 74,542 | 125.98 | 248,051 | 2.133 | 0.7 |
|  | 2.75 | 150 | 300 | 0.6 | 43.1 | 1.8 | 3.9 | 15,546 | 122.337 | 62,772 | 2.489 | 1.7 |
| MCI-8 | 4.5 | 120 | 300 | 1.3 | 46.1 | 1.5 | 4.4 | 5,478 | 122.99 | 63,144 | 2.250 | 0.8 |
|  | 15 | 150 | 300 | 0.7 | 43.1 | 3.2 | 4.6 | 1,718 | 123.785 | 14,388 | 2.773 | 1.9 |
| MCI-5 | 1 | 120 | 300 | 2.7 | 46.1 | 8.9 | 15.3 | 167,719 | 133.184 | 421,722 | 2.504 | 1.2 |
|  | 2.75 | 150 | 300 | 3.0 | 43.1 | 22.2 | 23.3 | 92,878 | 130.386 | 100,483 | 2.316 | 0.5 |
| MCI-4 | 4.5 | 190 | 300 | 0.6 | 44.2 | 1.6 | 2.6 | 6,334 | 128.137 | 21,592 | 3.637 | 1.4 |
| MCI-5 | 10 | 120 | 56 | 2.3 | 11.2 | 5.1 | 9.0 | 9,866 | 123.099 | 86,317 | 2.243 | 0.7 |
|  | 10 | 120 | 56 | 2.2 | 11.2 | 10.9 | 16.4 | 17,978 | 125.284 | 19,132 | 1.533 | 1.3 |
| MCI-6 | 5 | 120 | 300 | 1.1 | 46.1 | 0.6 | 4.4 | 4,930 | 130.4 | 115,318 | 2.57 | 1.0 |
|  | 12 | 120 | 300 | 0.6 | 46.1 | 1.2 | 4.7 | 2,194 | 131.6 | 125,443 | 2.67 | 1.5 |

*COCATALYST-1 was 1.2 eq
**MMAO-3A was 10 μmoles
***Reaction time was 10 minutes

TABLE 2

Batch Polymerization Data - Chain Transfer Evaluation

| Catalyst name | μmol | Temp (° C.) | CO-CATALYST-1 μmol | Exotherm (° C.) | DEZ mmol | Ethylene (g) initial | Ethylene (g) added | Yield (g) | Efficiency (gpoly/gmetal) | Tm (° C.) | Mw | Mw/Mn | Octene mol % |
|---|---|---|---|---|---|---|---|---|---|---|---|---|---|
| MCI-4 | 1 | 120 | 1.2 | 2 | 0 | 11.1 | 1.7 | 5.7 | 62,484 | 125.2 | 439,541 | 6.69 | 1 |
|  | 2 | 120 | 2.4 | 2.7 | 0 | 11.1 | 2.2 | 6.4 | 35,078 | 127.7 | 125,458 | 3.29 | 1.7 |
|  | 4 | 120 | 4.8 | 1.8 | 0 | 11.1 | 4.6 | 10.6 | 29,049 | 131.0 | 124,603 | 2.68 | 0.5 |
|  | 4 | 120 | 4.8 | 2.4 | 50 | 11.1 | 10.6 | 18.4 | 50,425 | 131.0 | 34,301 | 2.53 | 0.8 |
|  | 4 | 120 | 4.8 | 3.1 | 200 | 11.1 | 7.4 | 13.5 | 36,997 | 127.8 | 19,771 | 5.80 | 1.8 |
|  | 10 | 150 | 12 | 1.7 | 0 | 12.1 | 2.5 | 4.9 | 5,371 | 129.2 | 33,906 | 3.12 | 0.7 |
|  | 15 | 150 | 18 | 3.8 | 50 | 12.1 | 9.5 | 1.1 | 8,843 | 128.5 | 26,757 | 4.96 | 1.1 |
|  | 15 | 150 | 18 | 2.1 | 200 | 12.1 | 10.4 | 14 | 10,231 | 125.6 | 15,942 | 6.08 | 2.1 |
| MCI-5 | 4 | 120 | 4.8 | 3.0 | 0 | 11.1 | 4.7 | 10.7 | 29,323 | 131.9 | 157,734 | 2.81 | 1.7 |
|  | 4 | 120 | 4.8 | 2.1 | 50 | 11.1 | 9.5 | 16.8 | 46,323 | 132.0 | 18,979 | 1.41 | 0.4 |
|  | 4 | 120 | 4.8 | 1.8 | 200 | 11.1 | 4.6 | 9.6 | 26,309 | 127.8 | 3,803 | 1.61 | 1.9 |

*During the polymerization study, there was no change in the $H_{2(g)}$ pressure.
**Reaction time was 10 minutes
***There were 10 mmoles of MMAO-3A is each reaction batch

TABLE 3

Batch Polymerization Data-Chain Transfer Evaluation

| Catalyst Name | μmoles | Cocatalyst Name | μmoles | Temp (° C.) | CSA Name | CSA μmoles | Yield (g) | Efficiency (gpoly/gMetal) | Tm (° C.) | Mn | Mw | Mw/Mn | Octene mol % |
|---|---|---|---|---|---|---|---|---|---|---|---|---|---|
| MCI-9 | 1.5 | 1 | 1.8 | 120 |  |  | 19 | 138,852 | 115 | 112,693 | 263,701 | 2.3 | 1.2 |
| MCI-9 | 2.5 | 1 | 3 | 150 |  |  | 21 | 92,081 | 115 | 30,962 | 72,172 | 2.3 | 0.0 |
| MCI-9 | 3 | 1 | 3.6 | 150 | DEZ | 0 | 11 | 40,194 | 118 | 18,254 | 42,423 | 2.3 | 0.7 |
| MCI-9 | 4 | 1 | 4.8 | 150 | DEZ | 95 | 11 | 30,146 | 117 | 16,590 | 34,158 | 2.1 | 0.5 |
| MCI-9 | 4 | 1 | 4.8 | 150 | DEZ | 380 | 13 | 35,627 | 118 | 13,447 | 22,968 | 1.7 | 0.6 |
| MCI-12 | 0.10 | 1 | 0.12 | 120 |  |  | 2.0 | 43,848 | 130 | 83,205 | 1,354,200 | 16.3 | 4.1 |
| MCI-12 | 0.30 | 1 | 0.36 | 150 |  |  | 4.0 | 146,160 | 132 | 92,252 | 506,104 | 5.5 | 4.1 |
| MCI-12 | 0.30 | 1 | 0.36 | 190 |  |  | 1.0 | 36,540 | 129 | 25,460 | 133,883 | 5.3 | 2.3 |
| MCI-12 | 0.30 | 1 | 0.36 | 150 | DEZ | 0 | 1.2 | 43,848 | 134 | 65,774 | 216,212 | 3.3 | 1.4 |
| MCI-12 | 0.35 | 1 | 0.42 | 150 | DEZ | 50 | 1.5 | 46,980 | 133 | 33,974 | 99,144 | 2.9 | 0.4 |
| MCI-12 | 0.40 | 1 | 0.48 | 150 | DEZ | 200 | 1.1 | 30,146 | 132 | 8,931 | 31,444 | 3.5 | 0.5 |
| MCI-13 | 0.40 | 1 | 0.48 | 120 |  |  | 1.0 | 14,006 | 137.5 | 104,822 | 385,021 | 3.7 | 0.6 |
| MCI-13 | 0.60 | 1 | 0.72 | 150 |  |  | 1.0 | 9,338 | 132.6 | 43,265 | 129,399 | 3.0 | 0.6 |

TABLE 3-continued

Batch Polymerization Data-Chain Transfer Evaluation

| Catalyst | | Cocatalyst | | Temp | CSA | | Yield | Efficiency | Tm | | | | Octene |
|---|---|---|---|---|---|---|---|---|---|---|---|---|---|
| Name | μmoles | Name | μmoles | (° C.) | Name | umoles | (g) | (gpoly/gMetal) | (° C.) | Mn | Mw | Mw/Mn | mol % |
| MCI-14 | 0.10 | 1 | 0.12 | 120 | | | 0.9 | 98,658 | 135.5 | 199,712 | 827,957 | 4.2 | 0.8 |
| MCI-14 | 0.30 | 1 | 0.36 | 150 | | | 1.7 | 62,118 | 133.5 | 98,344 | 285,413 | 2.9 | 0.6 |
| MCI-14 | 0.50 | 1 | 0.6 | 190 | | | 0.8 | 17,539 | 127.6 | 15,047 | 104,842 | 7.0 | 1.7 |
| MCI-14 | 0.40 | 1 | 0.48 | 150 | DEZ | 0 | 1.0 | 27,405 | 132.1 | 38,260 | 109,646 | 2.9 | 0.6 |
| MCI-14 | 0.45 | 1 | 0.54 | 150 | DEZ | 50 | 0.9 | 21,924 | 131.3 | 14,324 | 47,138 | 3.3 | 0.5 |
| MCI-14 | 0.55 | 1 | 0.66 | 150 | DEZ | 200 | 0.6 | 11,959 | 129.2 | 4,681 | 21,582 | 4.6 | 0.8 |
| MCI-15 | 0.40 | 1 | 0.48 | 120 | | | 0.9 | 12,606 | 135.1 | 137,166 | 369,794 | 2.7 | 0.6 |
| MCI-15 | 0.60 | 1 | 0.72 | 150 | | | 0.9 | 8,404 | 132.5 | 23,609 | 74,572 | 3.2 | 0.4 |
| MCI-16 | 0.10 | 1 | 0.12 | 120 | | | 0.9 | 98,658 | 132.9 | 156,018 | 823,499 | 5.3 | 0.7 |
| MCI-16 | 0.70 | 1 | 0.84 | 150 | | | 0.5 | 14,918 | 128.3 | 132,919 | 775,490 | 5.8 | 0.7 |
| MCI-16 | 0.60 | 1 | 0.72 | 190 | | | 0.2 | 3,654 | 128.8 | 51,808 | 290,422 | 5.6 | 1.3 |

*During the polymerization study, there was no change in the $H_{2(g)}$ pressure.
**Reaction time was 10 minutes
***There were 10 mmoles of MMAO-3A is each reaction batch As mentioned previously, one feature of the phosphaguanidine metal-ligand complexes is that as catalyst, the complexes undergoes chain transfer with diethyl zinc (DEZ) to produce olefin block copolymers, and chain transfer with higher efficiency than other hard segment catalysts.

fer with diethyl zinc indicated by the decrease in molecular weight as concentrations of diethyl zinc were increased and the polydispersity index narrows under higher loadings of diethyl zinc.

TABLE 4

PPR Polymerization Data

| Catalyst | | Co-catalyst | | Corrected Yield | Mn | Mw | Mw/Mn (PDI) | Octene mol % | Quench time |
|---|---|---|---|---|---|---|---|---|---|
| name | μmol | name | μmol | (mg) | | | | | (s) |
| MCI-1 | 0.1 | 1 | 0.15 | 0.053 | 22,105 | 216,370 | 9.79 | 4.5 | 1800.81 |
| | 0.1 | 1 | 0.15 | 0.052 | 26,528 | 225,247 | 8.49 | 4.6 | 1800.82 |
| | 0.1 | 2 | 0.5 | 0.017 | — | — | — | — | 1800.21 |
| | 0.1 | 2 | 0.5 | 0.017 | — | — | — | — | 1801.02 |
| | 0.2 | 1 | 0.3 | 0.051 | 24,041 | 119,552 | 4.97 | 4.6 | 1801.05 |
| | 0.2 | 1 | 0.3 | 0.035 | 24,273 | 97,039 | 4.0 | 4.7 | 1800.90 |
| | 0.2 | 2 | 1.0 | 0.021 | 20,575 | 47,096 | 2.29 | 5.4 | 1800.52 |
| | 0.2 | 2 | 1.0 | 0.014 | — | — | — | — | 1801.53 |
| | 0.1 | 1 | 0.15 | 0.059 | 24,217 | 221,291 | 9.14 | 4.2 | 1800.31 |
| | 0.1 | 1 | 0.15 | 0.062 | 17,856 | 232,445 | 13.02 | 4.2 | 1800.40 |
| | 0.2 | 1 | 0.3 | 0.043 | 24,928 | 140,547 | 5.64 | 4.6 | 1800.42 |
| | 0.2 | 1 | 0.3 | 0.051 | 23,909 | 128,976 | 5.39 | 4.4 | 1800.40 |
| | 0.1 | 2 | 0.5 | 0.025 | 3,263 | 35,367 | 10.84 | 4.5 | 1801.02 |
| | 0.2 | 2 | 1.0 | 0.028 | 2,236 | 28,418 | 12.71 | 4.7 | 1800.41 |
| MCI-2 | 0.1 | 1 | 0.15 | 0.058 | 46,515 | 157,127 | 3.38 | 0.7 | 428.4 |
| | 0.1 | 1 | 0.15 | 0.053 | 44,842 | 118,240 | 2.64 | 0.6 | 391.9 |
| | 0.2 | 1 | 0.3 | 0.061 | 44,970 | 108,364 | 2.41 | 0.7 | 171.81 |
| | 0.2 | 1 | 0.3 | 0.056 | 42,799 | 100,195 | 2.34 | 0.6 | 198.8 |
| MCI-3 | 0.1 | 1 | 0.15 | 0.084 | 45,182 | 394,860 | 8.74 | 3.2 | 200.7 |
| | 0.1 | 1 | 0.15 | 0.076 | 45,460 | 449,971 | 9.9 | 3.3 | 201.7 |
| | 0.2 | 1 | 0.3 | 0.091 | 34,685 | 453,563 | 13.08 | 3.0 | 130.9 |
| | 0.2 | 1 | 0.3 | 0.09 | 54,851 | 439,217 | 8.01 | 3.2 | 125.1 |
| | 0.15 | 1 | 0.225 | 0.05 | 15,605 | 175,660 | 11.26 | 3.2 | 1800.8 |
| | 0.15 | 1 | 0.225 | 0.048 | 14,805 | 168,944 | 11.41 | 3.6 | 1800.3 |
| | 0.3 | 1 | 0.45 | 0.075 | 20,364 | 210,102 | 10.32 | 3.2 | 1801.51 |
| | 0.3 | 1 | 0.45 | 0.071 | 21,440 | 215,625 | 10.06 | 3.0 | 180.23 |

The previously disclosed zirconium phosphaguanidine polymerization catalysts of formula I have good activities and produce polyolefins with high molecular weight (greater than 300,000 g/mol) and narrow polydisperities at 120° C. This particularly evident with catalysts MCI-4 and MCI-5. These specific catalysts also undergo reversible chain trans- Unless otherwise indicated, the disclosure of any ranges in the specification and claims are to be understood as including the range itself and also anything subsumed therein, as well as endpoints.

It will be apparent to those skilled in the art that modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

The invention claimed is:

1. A metal-ligand complex comprising the phosphaguanidine compound of formula I

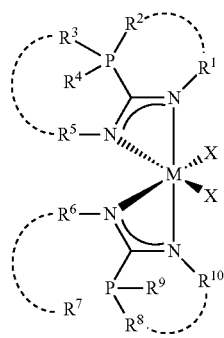

where:
R$^1$, R$^5$, R$^6$, and R$^{10}$ are independently selected from hydride, aliphatic, heteroaliphatic, aromatic, and heteroaromatic moieties;

R$^2$, R$^3$, R$^7$, and R$^8$ include the same or different moieties independently selected from aliphatic moieties, aromatic moieties, and heteroaromatic moieties;

R$^4$ and R$^9$ are independently a lone pair of electrons;

M is titanium, zirconium, or hafnium;

each X is independently selected from aliphatic moieties, aromatic moieties, NR$^N_2$ moeities or halide moieties, wherein R$^N$ is selected from alkyl, aryl, and heteroaryl moieties; and each dotted line optionally defines a bridging connection.

2. The metal-ligand complex of claim 1, wherein each R$^1$, R$^5$, R$^6$, and R$^{10}$ are independently selected from hydride, methyl, ethyl, iso-propyl, cyclohexyl, tert-butyl, neopentyl, phenethyl, benzyl, adamantyl, phenyl, 2,6-di-iso-propylphenyl, and 2,6-dimethylphenyl.

3. The metal-ligand complex of claim 1, wherein R$^2$, R$^3$, R$^7$, and R$^8$ are independently selected from ethyl, cyclohexyl, phenyl, and 4-methoxyphenyl.

4. The metal-ligand complex of claim 1, wherein each X independently is selected from a methyl, trimethylsilylmethyl (—CH$_2$SiMe$_3$), benzyl, chloro, and dimethylamido (NMe$_2$) group.

5. The metal-ligand complex of claim 1, wherein M is zirconium.

6. The metal-ligand complex of claim 1, wherein M is hafnium.

7. A polymerization catalyst system comprising the metal-ligand complex according to claim 1, wherein the polymerization catalyst system further comprises a chain transfer agent.

8. The polymerization catalyst system according to claim 7, wherein the chain transfer agent is diethyl zinc.

* * * * *